(12) United States Patent
Sugimoto et al.

(10) Patent No.: US 10,220,781 B2
(45) Date of Patent: Mar. 5, 2019

(54) TRAVEL ENVIRONMENT EVALUATION SYSTEM, TRAVEL ENVIRONMENT EVALUATION METHOD, DRIVE ASSIST DEVICE, AND TRAVEL ENVIRONMENT DISPLAY DEVICE

(71) Applicants: Hironobu Sugimoto, Chofu (JP); Teruhide Hayashida, Tokyo (JP); Hirokazu Nomoto, Tokyo (JP); Yoshihiro Oe, Kawasaki (JP); Kazuya Nishimura, Yokohama (JP); Yoshiyuki Kato, Kawasaki (JP)

(72) Inventors: Hironobu Sugimoto, Chofu (JP); Teruhide Hayashida, Tokyo (JP); Hirokazu Nomoto, Tokyo (JP); Yoshihiro Oe, Kawasaki (JP); Kazuya Nishimura, Yokohama (JP); Yoshiyuki Kato, Kawasaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 298 days.

(21) Appl. No.: 14/782,700

(22) PCT Filed: Apr. 12, 2013

(86) PCT No.: PCT/JP2013/061013
§ 371 (c)(1),
(2) Date: Oct. 6, 2015

(87) PCT Pub. No.: WO2014/167701
PCT Pub. Date: Oct. 16, 2014

(65) Prior Publication Data
US 2016/0046237 A1    Feb. 18, 2016

(51) Int. Cl.
*B60R 1/00*    (2006.01)
*H04N 7/18*    (2006.01)
(Continued)

(52) U.S. Cl.
CPC .............. *B60R 1/00* (2013.01); *B60W 40/02* (2013.01); *G01C 21/3453* (2013.01);
(Continued)

(58) Field of Classification Search
None
See application file for complete search history.

(56) References Cited

U.S. PATENT DOCUMENTS 5,559,707 A * 9/1996 DeLorme ............... G01C 21/20
340/990
6,008,740 A * 12/1999 Hopkins ........... G08G 1/096716
340/460
(Continued)

FOREIGN PATENT DOCUMENTS

JP    2000-76593 A    3/2000
JP    2002-230679 A   8/2002
(Continued)

Primary Examiner — Kate H Luo
(74) Attorney, Agent, or Firm — Sughrue Mion, PLLC

(57) ABSTRACT

A vehicle is provided with a driving environment information acquisition section, which acquires driving environment information, which is information on a driving environment of the vehicle. A center is provided with a driving environment evaluation section, which quantitatively evaluates the ease of traveling in the driving environment of the vehicle based on an analysis of the driving environment information acquired by the driving environment information acquisition section. A display section of the vehicle displays the result of evaluation by the driving environment evaluation section.

14 Claims, 25 Drawing Sheets

(51) Int. Cl.
  *G08G 1/0962* (2006.01)
  *B60W 40/02* (2006.01)
  *G01C 21/36* (2006.01)
  *G08G 1/0967* (2006.01)
  *G01C 21/34* (2006.01)

(52) U.S. Cl.
  CPC ..... *G01C 21/3484* (2013.01); *G01C 21/3492* (2013.01); *G01C 21/36* (2013.01); *G08G 1/0962* (2013.01); *G08G 1/09623* (2013.01); *G08G 1/096716* (2013.01); *G08G 1/096741* (2013.01); *G08G 1/096775* (2013.01); *H04N 7/18* (2013.01); *B60R 2300/802* (2013.01); *B60R 2300/804* (2013.01); *B60R 2300/8033* (2013.01); *B60R 2300/8053* (2013.01); *B60R 2300/8093* (2013.01)

(56) References Cited

U.S. PATENT DOCUMENTS

| | | | | |
|---|---|---|---|---|
| 6,359,571 B1* | 3/2002 | Endo | ............ | G01C 21/26 340/905 |
| 2005/0187714 A1* | 8/2005 | Brulle-Drews | ........ | G01C 21/26 702/3 |
| 2009/0201140 A1* | 8/2009 | Fargas | ............ | B60W 40/101 340/441 |
| 2010/0259609 A1* | 10/2010 | Takahashi | ........ | G06K 9/72 348/135 |
| 2010/0280751 A1* | 11/2010 | Breed | ............ | G08G 1/161 701/414 |
| 2012/0140988 A1* | 6/2012 | Takahashi | ........ | G06K 9/00805 382/103 |
| 2012/0158299 A1* | 6/2012 | Cerecke | ............ | G01C 21/3446 701/533 |
| 2012/0226391 A1* | 9/2012 | Fryer | ............ | G08G 1/202 701/1 |
| 2012/0245817 A1* | 9/2012 | Cooprider | ........ | B60W 50/0097 701/70 |
| 2013/0018577 A1* | 1/2013 | Gooding | ............ | G01C 21/3407 701/423 |
| 2013/0332061 A1* | 12/2013 | Dowdall | ........ | B60R 21/00 701/301 |

FOREIGN PATENT DOCUMENTS

| | | |
|---|---|---|
| JP | 2004-171159 A | 6/2004 |
| JP | 2008-139320 A | 6/2008 |
| JP | 2010-8271 A | 1/2010 |
| JP | 2012-207941 A | 10/2012 |
| WO | 2012/157018 A1 | 11/2012 |

* cited by examiner

Fig.2

| Large category | Small category | Classes of factors | Driving difficulty factors | Judgment of each level (Highest deduction points) |
|---|---|---|---|---|
| Road environment | Road width | Road structure | A single-lane road is not easy to drive because taking over is difficult. ... | P21 * * * |
| | | Non-road structure | A multiple-lane road with one lane closed due to a construction is not easy to drive because the road width is reduced. ... | P22 * * * |
| | Sight | Road structure | A one-tube, two-way tunnel is not easy to drive because the oncoming car headlights get in the eyes. ... | P23 * * * |
| | | Time of day | An unlit road is not easy to drive at night because of poor sight. ... | P24 * * * |
| | | Non-road structure | A road with parked cars is not easy to drive because of blocked view. ... | P25 * * * |
| | Speed | Road structure | A road with easy stop signs is not easy to drive because of the increased number of signs. ... | P26 * * * |
| | | Non-road structure | A bus route is not easy to drive because of busses stopping at each bus stop. ... | P27 * * * |

Fig.3

| Large category | Small category | Classes of factors | Driving difficulty factors | Judgment of each level (Highest deduction points) |
|---|---|---|---|---|
| Road environment | Risk | Road structure | A road without guardrails to separate sidewalks from vehicle traffic lanes is not easy to drive because of a higher possibility of contact with the traffic disadvantaged. | P31 |
| | | | ... | ... |
| | | | ... | ... |
| | | Non-road structure | A road with a heap of objects such as fallen leaves is not easy to drive. | P32 |
| | | | ... | ... |
| | | | ... | ... |
| | Decision | Road structure | A road where lanes change depending on time of day is not easy to drive. | P33 |
| | | | ... | ... |
| | | | ... | ... |
| | Operation | Road structure | A road with irregularities is not easy to drive because of flat tire possibilities and frequent need for steering operation. | P34 |
| | | | ... | ... |
| | | | ... | ... |

Fig. 4

| Large category | Small category | Classes of factors | Driving difficulty factors | Judgment of each level (highest deduction points) |
|---|---|---|---|---|
| Traffic condition | Movable body | Nature of movable body | A road with unstable movable bodies (pedestrians) is not easy to drive because of the possibility of contact. ... ... | P41 ... ... |
| | | Site-related characteristics | A road with students on their way to or from school is not easy to drive because of worries of their unexpected actions. ... ... ... ... ... ... | P42 ... ... ... ... ... ... |
| | Sight | Nature of movable body | ... ... | ... ... |
| | | Time of day | ... ... | ... ... |
| | Speed | Nature of movable body | A road with other car trying to take over is not easy to drive because of the necessity to yield or adjust speed. ... ... | P43 ... ... |
| | | Site-related characteristics | A road with a closed stretch is not easy to drive because of the possibility to be stuck in congestion or the necessity to avoid it. ... ... | P44 ... ... |

Fig.5

| Large category | Small category | Classes of factors | Driving difficulty factors | Judgment of each level (Highest deduction points) |
|---|---|---|---|---|
| Traffic condition | Risk | Nature of vehicle | A road with large vehicles is not easy to drive because driving behind a large vehicle is stressful. | P51 |
| | | | ... | . |
| | | | ... | . |
| | | Nature of movable body | A road with unstable movable bodies (pedestrians) is not easy to drive because of the possibility of contact. | P52 |
| | | | ... | . |
| | | | ... | . |
| | | | ... | . |
| | | Site-related characteristics | ... | . |
| | | | ... | . |
| | | | ... | . |
| | Decision | Nature of movable body | A road with an emergency vehicle is not easy to drive because of the necessity to yield and reduce speed. | P53 |
| | | | ... | . |
| | | | ... | . |
| | | | ... | . |
| | | Site-related characteristics | ... | . |
| | | | ... | . |
| | | | ... | . |
| | Operation | Nature of movable body | ... | . |
| | | | ... | . |
| | | | ... | . |
| | | Site-related characteristics | ... | . |
| | | | ... | . |
| | | | ... | . |

Fig.6

| Large category | Small category | Classes of factors | Driving difficulty factors | Judgment of each level (Highest deduction points) |
|---|---|---|---|---|
| Weather | Sight | Site-related characteristics | A road with the sun ahead in the driving direction is not easy to drive because it is bright. | P61 |
| | | | ... | ... |
| | | | ... | ... |
| | | Phenomenon | When it rains, it is not easy to drive because of poor sight. | P62 |
| | | | When it snows, it is not easy to drive because of poor sight. | ... |
| | | | ... | ... |
| | | Hazard | ... | ... |
| | | | ... | ... |
| | Risk | Phenomenon | ... | ... |
| | | | ... | ... |
| | | Hazard | ... | ... |
| | | | ... | ... |
| | Decision | Hazard | It is not easy to drive after an earthquake because the traffic conditions are severely affected. | P63 |
| | | | ... | ... |
| | Operation | Site-related characteristics | It is not easy to drive in strong winds because cars can be unsettled. | P64 |
| | | | ... | ... |
| | | | ... | ... |

Fig.7

| Category | Examples |
|---|---|
| Type of road | Highway/national road/prefectural road, etc. |
| Number of lanes | 1 lane/2 lanes/3 lanes/4 or more lanes |
| Layout of sidewalks | None/narrower than 2m/2m or wider |
| Layout of road shoulders | Narrower than 50cm/50 to 75cm, etc. |
| Road width | 3.0m or narrower/3.0 to 4.0m, etc. |
| Gradient | (degree) |

Fig.8

| Ranks of driving ease | Basic score A |
|---|---|
| S | 120 |
| A | 100 |
| B | 80 |
| C | 60 |
| D | 40 |

Fig.11

| ID | Coordinates | Road link | Imaging date and time | Image file name | Driving ease index | Large categories of driving ease factors | Elements of driving ease factors | Score |
|---|---|---|---|---|---|---|---|---|
| ID000001 | X1,Y1 | A00001 | YY/MM/DD/Time | image00001 | 45 | Road structural factors | One-lane road with sidewalk | 80 |
| | | | | | | | Utility pole occupying part of the road | -15 |
| | | | | | | Road environment | Pedestrian | -10 |
| | | | | | | Traffic condition | Rain | -10 |
| | | | | | | Weather condition | | |
| ... | ... | ... | ... | ... | ... | ... | ... | ... |

Fig.13

| Driving ease index Y | Easiness level | Description |
|---|---|---|
| 80 or more | A | Very easy to drive |
| 60-79 | B | Easy to drive |
| 40-59 | C | Hard to drive |
| 20-39 | D | Very hard to drive |
| 19 or less | E | Extremely hard to drive |

Fig. 20
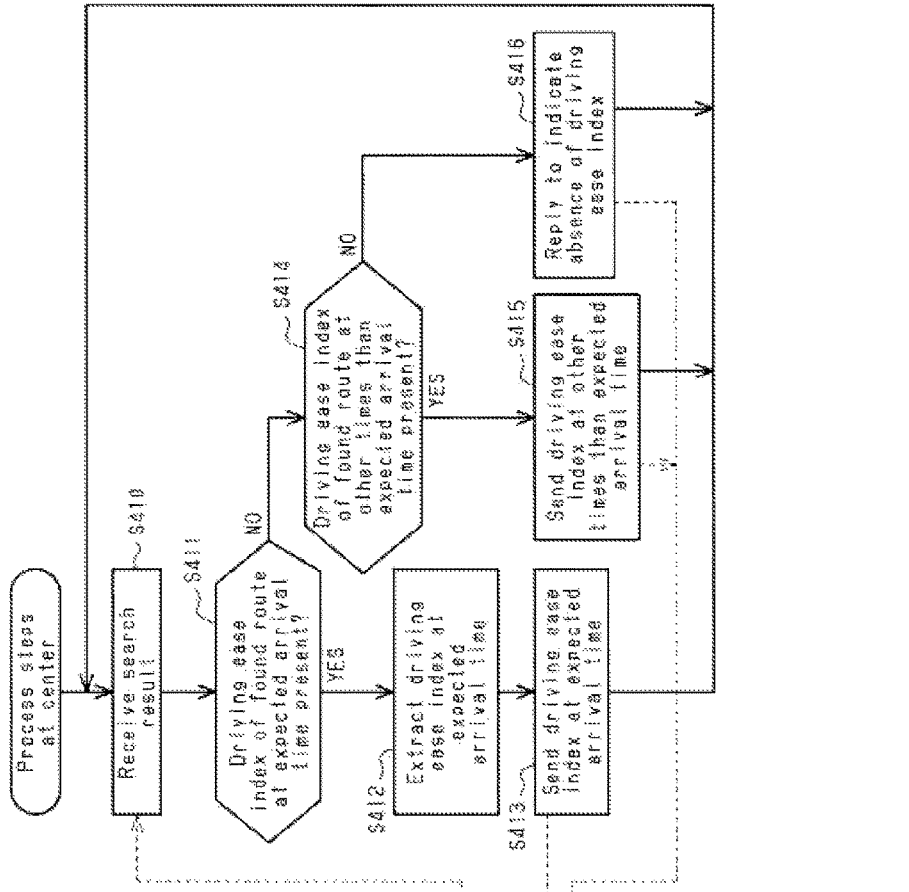
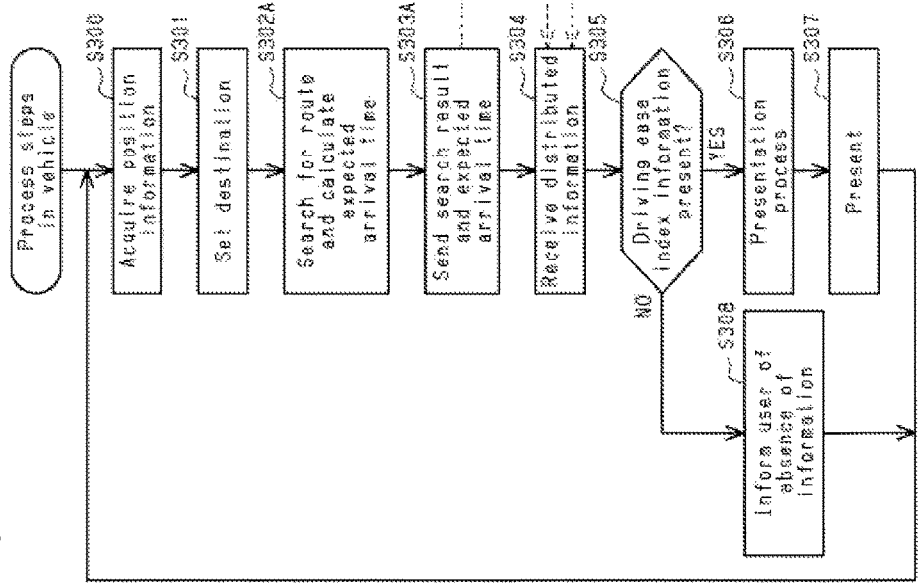

Fig.23

| Image vectors of teacher image | | Driving environment | Points to be deducted from driving ease index |
|---|---|---|---|
| Road environment | x1, y1, z1 | Varying road width | 10 |
| | x2, y2, z2 | Road shoulder of less than ( ) m | 20 |
| | ... | ... | ... |
| Traffic condition | x10, y10, z10 | School children to or from school | 15 |
| | x11, y11, z11 | Oncoming car's headlight at night | 10 |
| | ... | ... | ... |
| Weather condition | x20, y20, z20 | Snow | 10 |
| | x21, y21, z21 | Rain | 10 |
| | ... | ... | ... |
| | xn, yn, zn | ... | ... |

| Image vectors of teacher image | Situations (road environment, traffic condition, weather condition) | Driving ease index |
|---|---|---|
| x1, y1, z1 | School zone, with guardrails, no protruding utility poles | 60 |
| x2, y2, z2 | Poor sight due to fog | 20 |
| x3, y3, z3 | Irregular road surface, many large vehicles | 30 |
| x4, y4, z4 | Constant road width of 3m or more, no obstacles on road | 120 |
| x5, y5, z5 | ... | ... |
| ... | ... | ... |

TRAVEL ENVIRONMENT EVALUATION SYSTEM, TRAVEL ENVIRONMENT EVALUATION METHOD, DRIVE ASSIST DEVICE, AND TRAVEL ENVIRONMENT DISPLAY DEVICE

CROSS REFERENCE TO RELATED APPLICATIONS

This application is a National Stage of International Application No. PCT/JP2013/061013 filed Apr. 12, 2013, the contents of all of which is incorporated herein by reference in its entirety.

TECHNICAL FIELD

The present invention relates to a driving environment evaluation system, a driving environment evaluation method, and a driver assistance system, which are advantageously applied to the evaluation of a driving environment of a movable body, and to a driving environment display device, which is advantageously applied to the displaying of a driving environment of a movable body.

BACKGROUND ART

Services of providing information indicative of an environment on roads to vehicles or various types of information terminals have been developed progressively in recent years, and, as one example of such a system for monitoring the road environment, a road monitoring system described in Patent Document 1 is known.

The road monitoring system described in Patent Document 1 takes pictures of the driving environment on the road with a plurality of imaging cameras $30a$ to $30c$ set up at predetermined spacing on the side of the road, as shown in FIG. 28. The taken images are analyzed to determine an event happening on the road. If, for example, a plurality of fallen objects D is detected to be present 1 km ahead of a vehicle C through such a determination, this detection result is displayed on an information display panel 61. In this determination of events, an obstacle or a traffic congestion situation is detected through an analysis of the taken images.

PRIOR ART DOCUMENTS

Patent Documents

Patent Document 1: Japanese Laid-Open Patent Publication No. 2002-230679

SUMMARY OF THE INVENTION

Problems that the Invention is to Solve

When a user is informed of the detected event on the road, the user is required to recognize the effects of such an event on the ease of traveling (driving) a movable body such as a vehicle, and to autonomously evaluate a state of the driving environment. There are various other events that may affect the driving ease other than fallen objects. For this reason, a quantitative evaluation of a driving environment with various events taken into consideration is difficult itself.

Accordingly, it is an objective of the invention to provide a driving environment evaluation system and driving environment evaluation method that allow for quantitative evaluation of driving environments, a driver assistance system that uses the driving environment evaluation system, and a driving environment display device that displays evaluation results of driving environments quantitatively.

Means for Solving the Problems

Means for achieving the above objective and advantages thereof will now be discussed.

To achieve the foregoing objectives and in accordance with the present invention, a driving environment evaluation system is provided that includes a driving environment information acquisition section, which acquires driving environment information, which is information on a driving environment of a movable body, and a driving environment evaluation section, which quantitatively evaluates ease of traveling of a driving environment of the movable body based on an analysis of driving environment information acquired by the driving environment information acquisition section.

To achieve the foregoing objectives and in accordance with the present invention, a driving environment evaluation method comprising the steps of: acquiring driving environment information, which is information on a driving environment of a movable body; and quantitatively evaluating ease of traveling of a driving environment of the movable body based on an analysis of the acquired driving environment information.

With the configuration or method described above, driving environment information on a driving environment of a movable body is acquired. This driving environment information is then identified. The driving environment is quantitatively evaluated based on the identification results from the viewpoint of ease of traveling by the movable body. This enables quantitative evaluation of ease of traveling by the movable body, so that quantitative information on the ease or difficulty of traveling can be provided.

In one aspect of the present invention, the driving environment information includes information on at least one factor of a road environment, a traffic condition, and a weather condition.

Road environments, traffic conditions, and weather conditions can all largely affect the ease of traveling by a movable body. In this respect, in the configuration described above, information on at least one factor of a road environment, a traffic condition, and a weather condition is acquired as the driving environment information, based on which evaluation is made. Therefore, the evaluation precisely takes into consideration the factor(s) that may affect the ease of traveling.

In one aspect of the present invention, information on the road environment, the traffic condition, and the weather condition is classified based on categories that are specified for each of factors correlated to ease of traveling by the movable body, and the driving environment evaluation section analyzes each of the categories as one unit and integrates analysis results given per category to make a quantitative evaluation of the ease of traveling.

A road environment, a traffic condition, and a weather condition are represented by a plurality of factors that correlates to the ease of traveling such as the status of objects existing around the road (road environment), pedestrians or vehicles ahead (traffic condition), or rainfall, fog, and sunlight (weather condition). These various factors constitute a driving environment. Therefore, various factors are comprehensively reflected in the ease of traveling by a movable body of a driving environment.

In this respect, in the configuration described above, the road environment, the traffic condition, and the weather condition are classified based on categories that are specified for each of factors correlated to the ease of traveling. Evaluation is made for each category as a unit, and evaluation results given per category are integrated. The driving environment is thus evaluated by integrating the evaluation results given per category. Thus, the evaluation of the driving environment reflects the evaluation results of various categories defined for each of the road environment, the traffic condition, and the weather condition. Accordingly, the driving environment, which is constituted by a wide variety of factors, is precisely evaluated.

In one aspect of the present invention, the movable body is a vehicle. When the driving environment information contains information on the road environment, the driving environment evaluation section analyzes information on the road environment in at least one of categories of "road width," which is a width of a road, "sight" of a driver of the vehicle, "speed" of the vehicle, "risk" of the road environment, "decision" made by the driver of the vehicle, and "operation" required for driving of the vehicle.

"Road width," mentioned above, is a category of the road environment that represents the width of the road. For example, a road with a predetermined "road width" or more is easy to travel along, while a road narrower than the predetermined "road width" is hard to travel along. In addition, for example, a road with the "road width" maintained constant is easy to travel along, while a road with occasionally varying width is hard to travel along.

Therefore, in the configuration described above, "road width" is defined as a category of the road environment, and is evaluated. Accordingly, the driving environment can be evaluated based on the value of the road width or a change in the width within a predetermined zone. Thus, a driving environment can be evaluated with the "road width" taken into consideration.

The "road width" mentioned above is a category of the road environment for evaluating difficulty of driving due to whether or not the driver of the vehicle has a good sight. For example, if a structure such as a utility pole is not protruded into the road and the road has a certain width, the road is easy to travel along. On the contrary, if there is a structure that protrudes into the road and makes the road width narrower, the road is hard to travel along due to the reduced width.

Therefore, in the configuration described above, "road width" is defined as a category of the road environment, and this "road width" is evaluated. Accordingly, the driving environment can be evaluated based on a factor that affects the road width in the road environment. Thus, a driving environment can be evaluated with the "road width" taken into consideration.

The "speed" mentioned above is a category of the road environment for evaluating difficulty of driving due to factors that change or limit the driving speed. For example, the greater the number of factors that cause the driving speed to change such as railroad crossings, intersections, and stop signs on the road within a predetermined driving zone becomes, the harder the zone is to travel along, as the vehicle is required to reduce speed or stop more frequently. On the contrary, the closer to zero the number of factors that cause a speed change becomes within such a predetermined driving zone, the easier the zone is to travel along, as the vehicle needs to reduce speed or stop, and gain speed again after the deceleration or stop, less frequently. Similarly, for example, the greater the number of limiting factors such as a driving restriction or speed limit within a predetermined driving zone becomes, the harder the zone is to travel along, as the vehicle is required to reduce speed more frequently. On the contrary, the closer to zero the number of limiting factors is within such a predetermined driving zone, the easier the zone is to travel along, as the vehicle needs to reduce speed and gain speed again after the deceleration less frequently.

Therefore, in the configuration described above, "speed" is defined as a category of the road environment, and this "speed" is evaluated. Accordingly, the driving environment can be evaluated based on a factor that affects the speed in the road environment. Thus, a driving environment can be evaluated with the "speed" taken into consideration.

The "risk" mentioned above is a category of the road environment for evaluating difficulty of driving due to the presence of a risk for the vehicle. For example, in a road without guardrails, a road where the sidewalk is not separated from the vehicle traffic lanes with a certain distance, or a road where the opposite lanes are not separated with a certain distance, there is a higher risk than normal that the host vehicle comes close to a pedestrian or an oncoming car. The driver is therefore required to take the risk into consideration and drive more carefully, so that such a road tends to be harder to travel along. On the contrary, in a road with guardrails, a road where the sidewalk is separated from the vehicle traffic lanes with a certain distance, or a road where the opposite lanes are separated with a certain distance, there is a lower risk that the driver's vehicle comes close to a pedestrian or an oncoming car. Therefore, the driver is not required to pay more attention than necessary to the risk factors in driving, so that the driver can drive at ease.

Therefore, in the configuration described above, "risk" is defined as a category of the road environment, and this "risk" is evaluated. Accordingly, the driving environment can be evaluated based on a factor that affects the risk in the road environment. Thus, a driving environment can be evaluated with the "risk" taken into consideration.

The "decision" mentioned above is a category of the road environment for evaluating difficulty of driving based on factors that cause the driver of the vehicle to make a decision as to whether or not a specific driving operation is required. For example, in a road with many intersections within a predetermined driving zone, the driver is required to make a decision which way to go at every intersection of the road. In a road where the direction of lanes changes depending on the time of day, the driver is required to recognize the date and time as well as make a decision as to the driving direction. The more frequently the driver needs to make such a decision, the harder it is to travel along. On the contrary, the less frequently the driver needs to make such a decision, the easier it is to travel along.

Therefore, in the configuration described above, "decision" is defined as a category of the road environment, and this "decision" is evaluated. Accordingly, the driving environment can be evaluated based on a factor that affects the decision in the road environment. Thus, a driving environment can be evaluated with the "decision" taken into consideration.

The "operation" is a category for evaluating difficulty of driving due to factors that require a specific driving operation. For example, in a road where there is a sharp curve, a sudden operation of the steering wheel, or a braking operation, in accordance with the sharp bend is required, and thus such a road is hard to travel along. If there are many curves within a predetermined driving zone, the driver is required to operate the steering wheel or the brake pedal frequently, so that the road is hard to travel along. On the contrary, a road where the driver is less frequently required to operate the steering wheel or the brake pedal, and the acceleration pedal after braking, is easy to travel along.

Therefore, in the configuration described above, the "operation" is defined as a category of the road environment, and this "operation" is evaluated. Accordingly, the driving environment can be evaluated based on a factor that affects the operation in the road environment. Thus, a driving environment can be evaluated with the "operation" taken into consideration.

In the configuration described above, the road environment is evaluated based on several such categories. Therefore, the road environment is evaluated from several points of view. Therefore, the road environment that is constituted by various factors is precisely evaluated.

In one aspect of the present invention, the movable body is a vehicle. When the driving environment information contains information on the traffic condition, the driving environment evaluation section analyzes information on the traffic condition in at least one of categories of "movable body" other than a host vehicle, "sight" of a driver of the vehicle, "speed" of at least the host vehicle, "risk" around the vehicle, "decision" made by the driver of the vehicle, and "operation" required for driving of the vehicle.

The "movable body" is a category of the traffic condition for evaluating difficulty of driving due to the existence of a movable body other than the host vehicle. For example, in a road in a school route, a shopping district, or a tourist attraction site, there are many movable bodies such as pedestrians or cyclists, and these movable bodies often move on the road or come close to the road. Therefore, a road where such movable bodies exist is hard to travel along by the vehicle. On the contrary, a road with fewer movable bodies that obstruct the movement of the vehicle is easier to travel along.

Therefore, in the configuration described above, "movable body" is defined as a category of the traffic condition, and this "movable body" is evaluated. Accordingly, the driving environment can be evaluated based on the existence or nature of a "movable body" around the road. Thus, a driving environment can be evaluated with the "movable body" taken into consideration.

The "sight" mentioned above is a category of the traffic condition for evaluating difficulty of driving due to whether or not the driver of the vehicle has a good sight. For example, when there is good visibility, without large vehicles that obstruct the sight, or oncoming vehicles at night, the road is easy to travel along. On the contrary, if there are large vehicles, or oncoming vehicles at night, visibility is not good enough and the road is harder to travel along, since a large vehicle may obstruct the sight ahead in the driving direction, or the oncoming vehicle's headlight may direct its beam toward the driver.

Therefore, in the configuration described above, "sight" is defined as a category of the traffic condition, and this "sight" is evaluated. Accordingly, the driving environment can be evaluated based on a factor that affects the sight in the traffic condition. Thus, a driving environment can be evaluated with the "sight" taken into consideration.

The "speed" mentioned above is a category of the traffic condition for evaluating difficulty of driving due to factors that change or limit the driving speed. For example, in a bus route, the traffic flow is changed by buses, as they stop and go at bus stops on the road. The driver is required to reduce speed or stop in accordance with the change in the traffic flow, and thus the road is hard to travel along. When there is a blocked lane, there may be congestion as a result of this, and such a road is hard to travel along. On the contrary, when there are no such factors that change or limit the driving speed, the driver can drive without being affected by the traffic condition, and thus it is easy to travel along.

Therefore, in the configuration described above, "speed" is defined as a category of the traffic condition, and this "speed" is evaluated. Accordingly, the driving environment can be evaluated based on a factor that affects the speed in the traffic condition. Thus, a driving environment can be evaluated with the "speed" taken into consideration.

The "risk" mentioned above is a category of the traffic condition for evaluating difficulty of driving due to the presence of a risk for the vehicle. For example, in a traffic condition where there is a taxi on the road, the driver is required to drive in consideration of the taxi, since the taxi may suddenly start or pull up on the road, and thus such a road is hard to travel along. Another example of a traffic condition is a road where there is a truck, and such a road is hard to travel along since the driver tends to feel uncomfortable because of the worry that a load may fall off the truck.

Therefore, in the configuration described above, "risk" is defined as a category of the traffic condition, and this "risk" is evaluated. Accordingly, the driving environment can be evaluated based on a factor that affects the risk in the traffic condition. Thus, a driving environment can be evaluated with the "risk" taken into consideration.

The "decision" mentioned above is a category of the traffic condition for evaluating difficulty of driving based on factors that cause the driver of the vehicle to make a decision as to whether or not a specific driving operation is required. For example, in a road where there is an emergency vehicle, the driver is required to make a decision regarding the driving operation for yielding to the emergency vehicle. At an intersection or the like with heavy traffic but without a traffic light, the driver is required to make a decision as to when to turn left or right at the intersection. The more frequently the driver needs to make such a decision, the harder it is to travel along. On the contrary, the less frequently the driver needs to make such a decision, the easier it is to travel along.

Therefore, in the configuration described above, "decision" is defined as a category of the traffic condition, and this "decision" is evaluated. Accordingly, the driving environment can be evaluated based on a factor that affects the decision in the traffic condition. Thus, a driving environment can be evaluated with the "decision" taken into consideration.

The "operation" is a category for evaluating difficulty of driving due to factors that require a specific driving operation. For example, a road with a high risk of encounters with animals is hard to travel along because a driving operation for avoiding a close encounter with an animal is necessary. A narrow road with heavy traffic is harder to travel along than other roads, because of the tendency that the amount of operation of the vehicle required when joining or leaving a line of cars is relatively increased.

Therefore, in the configuration described above, "operation" is defined as a category of the traffic condition, and this "operation" is evaluated. Accordingly, the driving environment can be evaluated based on a factor that affects the operation in the traffic condition. Thus, a driving environment can be evaluated with the "operation" taken into consideration.

In the configuration described above, the traffic condition is evaluated based on several such categories. Therefore, the traffic condition is evaluated from several points of view.

Therefore, the traffic condition that is constituted by various factors is precisely evaluated.

In one aspect of the present invention, the movable body is a vehicle. When the driving environment information contains information on the weather condition, the driving environment evaluation section analyzes information on the weather condition in at least one of categories of "sight" of a driver of the vehicle, "risk" in driving the vehicle, "decision" made by the driver of the vehicle, and "operation" required for driving of the vehicle.

The "sight" mentioned above is a category of the weather condition for evaluating difficulty of driving due to whether or not the driver of the vehicle has a good sight. Presence of weather conditions such as rain, snow, fog, and the sun ahead in the driving direction lowers sight and makes it harder to travel along. Conversely, if the weather is fine, or if the sun is not ahead in the driving direction, it is easier to travel along as there are no weather conditions that obstruct the sight.

Therefore, in the configuration described above, "sight" is defined as a category of the weather condition, and this "sight" is evaluated. Accordingly, the driving environment can be evaluated based on a factor that affects the sight in the weather condition. Thus, a driving environment can be evaluated with the "sight" taken into consideration.

The "risk" mentioned above is a category of the weather condition for evaluating difficulty of driving due to the presence of a risk for the vehicle. For example, in a weather condition where it is raining or snowing, the road is slippery and the vehicle stability is lowered. The road is therefore hard to travel along in such a weather condition that affects the road surface condition. Another example of a weather condition is lightning, and a road in an area where there is lightning is hard for the driver to travel along because the driver tends to be afraid of lightning strikes.

Therefore, in the configuration described above, "risk" is defined as a category of the weather condition, and this "risk" is evaluated. Accordingly, the driving environment can be evaluated based on a factor that affects the risk in the weather condition. Thus, a driving environment can be evaluated with the "risk" taken into consideration.

The "decision" mentioned above is a category of the weather condition for evaluating difficulty of driving based on factors that cause the driver of the vehicle to make a decision as to whether or not a specific driving operation is required. For example, in an area hit by a weather hazard, the driver is required to make a decision as to how to avoid the weather hazard, or to act accordingly to the traffic flow that is disturbed due to the weather hazard. The more frequently the driver needs to make such a decision, the harder it is to travel along. On the contrary, the less frequently the driver needs to make such a decision, the easier it is to travel along.

Therefore, in the configuration described above, "decision" is defined as a category of the weather condition, and this "decision" is evaluated. Accordingly, the driving environment can be evaluated based on a factor that affects the decision in the weather condition. Thus, a driving environment can be evaluated with the "decision" taken into consideration.

The "operation" is a category for evaluating difficulty of driving due to factors that require a specific driving operation. For example, if a gale is blowing that may affect the driving of the vehicle, a driving operation for stabilizing the driving position of the vehicle is required. Accordingly, an increased amount of driving operation is necessary as compared to a normal driving operation, and therefore the road in the area with a gale is hard to travel along.

Therefore, in the configuration described above, "operation" is defined as a category of the weather condition, and this "operation" is evaluated. Accordingly, the driving environment can be evaluated based on a factor that affects the operation in the weather condition. Thus, a driving environment can be evaluated with the "operation" taken into consideration.

In the configuration described above, the weather condition is evaluated based on several such categories. Therefore, the weather condition is evaluated from several points of view. Therefore, the weather condition that is constituted by various factors is precisely evaluated.

In one aspect of the present invention, a symbol is defined for each of a plurality of influential factors, which are factors that affect the evaluation of the driving environment. The system further includes a symbol selection section, which selects one of the symbols corresponding to an influential factor identified in the evaluation of the driving environment.

In the configuration described above, symbols are defined correspondingly to influential factors, which are factors that may affect the evaluation of the driving environment. In evaluation of a driving environment, when an influential factor is identified, the symbol corresponding to this identified influential factor is selected. In this way, with the selected symbol being presented, for example, not only the evaluation results of the driving environment, but also the influential factors affecting the evaluation results can be shown as guidance.

In one aspect of the present invention, the driving environment information acquisition section acquires the driving environment information by a camera mounted on the movable body. The driving environment evaluation section makes the evaluation through an analysis of an image taken by the camera.

With the camera, images that show the conditions of more factors, including both static and dynamic factors, of the driving environment of the movable body can be taken. Moreover, images taken by a camera are very close to the images of the driving environment viewed by the user of the movable body.

Therefore, in the configuration described above, the driving environment information is acquired with a camera mounted on the movable body. The images taken by the camera are analyzed to identify and evaluate the driving environment. Therefore, the driving environment is evaluated more accurately.

In one aspect of the present invention, the driving environment information contains information on at least one factor of traffic information or weather information distributed by a road traffic center, detection results of a millimeter-wave radar provided to the movable body, and an amount of change in an operated element of the movable body.

The traffic information distributed by the road traffic center includes information on traffic accidents, congestion, and other information mainly related to traffic conditions. It is possible to know the driving environment at a distant point or of a wide area based on this traffic information. The traffic condition that the traffic information indicates has a strong correlation to ease of traveling. Therefore, the driving environment of a wider area can be evaluated from the viewpoints of the traffic condition.

The weather information distributed by the road traffic center includes information on weather, road surface condition, wind speed, and other information related to weather conditions. It is possible to know the driving environment at a distant point or of a wide area based on this weather information. The weather condition that the weather information indicates has a strong correlation to ease of traveling. Therefore, the driving environment of a wider area can be evaluated from the viewpoints of the weather condition.

Whether there is an object around the movable body, and the distance between the movable body and the object, are detected based on the detection results of the millimeter-wave radar. If, for example, the detection results of the millimeter-wave radar indicate the presence of an object within a predetermined range around the movable body, it can be assumed that the driving environment observed by the millimeter-wave radar is hard to travel along because this object may obstruct the travel. Therefore, evaluation can be made, with the positional relationship between an object and the movable body in the driving environment taken into consideration, based on the detection results of the millimeter-wave radar.

The condition of the movable body that changes in accordance with the driving environment is determined based on the amount of change in an operated element of the movable body. Since a driving environment has some correlation with the amount of change in an operated element, it is possible to determine the driving environment based on the amount of change in the operated element. For example, when the movable body is a vehicle and the amount of change in an operated element indicates a wiper operating in short cycles, it is assumed that it is raining heavily in the driving environment. In addition, when the amount of change in an operated element indicates a steering wheel being operated by more than a predetermined amount, it is assumed that there is a sharp curve in the driving environment. In addition, when the amount of change in an operated element indicates the brake pedal being operated several times within a predetermined period, it is assumed that the driving environment includes many sign stops and railway crossings. Therefore, the amount of change in an operated element that changes in accordance with the driving environment can be used as the basis for inferring a driving environment that has a close correlation with the amount of change.

The larger the amount of change in an operated element, or the more frequent the change in the operated element, the lower the ease of traveling, since it means more operation is required of the user of the movable body. Therefore, the driving environment can be evaluated directly based on the change of amount in an operated element in such a form, for example, that, when the amount of change is lower than a specified value, a "high" evaluation is given, while when the amount of change is no less than a specified value, a "low" evaluation is given.

In the configuration described above, the driving environment is identified from several points of view based on all the factors of the traffic information and the weather information distributed by the road traffic center, detection results of the millimeter-wave radar, and the amount of change in an operated element of the movable body. Accordingly, the factors that affect the ease of traveling are identified precisely, and these identified factors are reflected in the evaluation results. Thus, highly precise evaluation adapted to the actual driving environment is realized.

In one aspect of the present invention, the driving environment evaluation section is provided to a center where the acquired driving environment information is collected, and the center includes a distribution section, which distributes information on evaluation results produced by the driving environment evaluation section to an information terminal.

In the configuration described above, the driving environment evaluation section is provided in the center, which collects driving environment information from a plurality of movable bodies. Therefore, the driving environment evaluation section can evaluate the driving environment of each traveling route based on the driving environment information collected in a wider area and from various traveling routes. The evaluation results thus achieved are sent to information terminals such as multi-functional phones, navigation systems, personal computers, and the like. Thus, evaluation results of a wider area and various traveling routes can be provided via the information terminal.

In one aspect of the present invention, the driving environment information acquisition section and the driving environment evaluation section are mounted on an information terminal, and the driving environment evaluation section evaluates the driving environment through matching of the driving environment information with a plurality of identification information sets given for identification of the driving environment.

In the configuration described above, the driving environment information acquisition section and the driving environment evaluation section are mounted on an information terminal. The driving environment is evaluated by matching the driving environment information with a plurality of identification information sets given for identification of the driving environment. Thus, one of the identification information sets that is identical or close to the driving environment information, for example, is determined as information that indicates the driving environment at the time when the driving environment information is acquired. The driving environment is then evaluated based on the determined identification information. Therefore, the driving environment can be evaluated in the information terminal alone.

In the configuration described above, the driving environment is evaluated by matching the driving environment information with a plurality of identification information sets given for identification. Therefore, the information terminal need not analyze the driving environment information, nor identify the driving environment based on the analysis results. Accordingly, the information terminal can evaluate the driving environment with simpler processing.

In one aspect of the present invention, the driving environment evaluation section determines at least one of a route found by a route search function of the information terminal and a position of the information terminal, and evaluates a driving environment of the determined route or position.

In the configuration described above, when the location of the information terminal is identified, the driving environment of this identified location is evaluated. Therefore, the driving environment is evaluated in accordance with the location of the information terminal. Thus, evaluation results of the driving environment corresponding to the location can be presented.

In the configuration described above, when a route is found by a route search function of the information terminal, the driving environment of this route is evaluated. Accordingly, the evaluation results of the driving environments of the route until the user of the information terminal reaches the destination can be shown as guidance. In the configuration described above, when several routes are found as routes to one destination, the driving environment of each route is evaluated. Thus, the user of the information terminal can also select a route to the destination based on the evaluation of the driving environment of each route. Accordingly, a route that is easier to travel along can be suggested as guidance.

In one aspect of the present invention, the driving environment evaluation section evaluates the driving environment through process steps of:

a) calculating a basic score by a quantitative evaluation of structural factors of a road to be evaluated, based on road map data containing information on a road map registered therein;

b) quantifying minus factors that reduce the ease of traveling based on an analysis of a driving environment indicated by the driving environment information; and c) calculating an index that quantitatively evaluates the ease of traveling by subtracting quantified values of the minus factors that reduce the ease of traveling from the basic score.

The road map data mentioned above includes information on a static driving environment such as road alignment and traffic elements at an intersection. This static driving environment is intrinsic to each point and correlates with the ease of traveling by the movable body. On the other hand, the driving environment indicated by the driving environment information includes dynamic elements that change depending on the date or time. The actual driving environment is constituted by both of these static and dynamic elements in the driving environment. Therefore, the ease of traveling of the actual driving environment is determined by both the static and dynamic elements in the driving environment.

In the configuration described above, in evaluation of the driving environment, basic scores are calculated by a quantitative evaluation of structural factors of the road to be evaluated based on the road map data. Thus, scores indicating the ease of traveling intrinsic to each point are calculated. Next, minus factors, which reduce the ease of traveling, are quantified based on identification of the driving environment indicated by the driving environment information. Thus, minus factors, which are the factors that reduce the ease of traveling of the driving environment indicated by the driving environment information, are quantified. Next, values of the quantified factors, which reduce the ease of traveling, are deducted from the basic scores to calculate indices, which quantitatively evaluate the ease of traveling. The calculated indices are the evaluation results of the driving environment. Thus, an index showing the ease of traveling of a driving environment that takes static and dynamic factors into consideration is computed as an evaluation result. Thus, the actual driving environment can be precisely and quantitatively evaluated.

In one aspect of the present invention, a driver assistance system that assists a driver in driving a movable body is provided. The system includes a route search section, which searches for a route to a set destination, and a presentation processing section, which carries out a process step of presenting ease of traveling of a route to the destination evaluated based on an evaluation result produced by the driving environment evaluation system according to any one of claims 1 to 13.

In the configuration described above, when a destination is set, a route from the current location of the vehicle to the destination is searched for. The ease of traveling of the route thus found is evaluated by the driving environment evaluation system. The evaluation results are then presented. Therefore, when a route to the set destination is suggested as guidance, the ease of traveling of this route is presented. The driver can therefore know the ease of traveling to the destination in advance. When there are several routes to a set destination, the ease of traveling of each route is presented. The driver can therefore select a route based on the presented ease of traveling of each route.

In one aspect of the present invention, a driving environment display device is provided that displays evaluation results of a driving environment of a movable body. The display device includes a display section, which displays an evaluation of a driving environment of a movable body, wherein ease of traveling of a road is evaluated based on an analysis of the driving environment of the movable body as one of symbols defined correspondingly to the evaluation results of the driving environment.

In the configuration described above, when a driving environment is evaluated, symbols that are defined correspondingly to the evaluation results are selected. The selected symbols are then displayed. Therefore, the user can know the ease of traveling of the driving environment that is being evaluated only by viewing the symbols.

In one aspect of the present invention, the display section displays at least one factor of a road environment, a traffic condition, and a weather condition as a first symbol, and displays a second symbol, which is defined correspondingly to an influential factor, which is a factor that affects the evaluation of the driving environment.

In the configuration described above, second symbols are defined correspondingly to influential factors, which are factors that affect the evaluation of the driving environment. In evaluation of a driving environment, when an influential factor is identified, the second symbol corresponding to this identified influential factor is selected. In this way, with the selected second symbols being presented, for example, not only the evaluation results of the driving environment, but also the influential factors affecting the evaluation results can be shown as guidance.

BRIEF DESCRIPTION OF THE DRAWINGS

FIG. 2 is a diagram showing an example of small categories, classes of factors, and points to be deducted from a driving ease index, defined for a road environment.

FIG. 3 is a diagram showing an example of small categories, classes of factors, and points to be deducted from a driving ease index, defined for a road environment.

FIG. 4 is a diagram showing an example of small categories, classes of factors, and points to be deducted from a driving ease index, defined for traffic conditions.

FIG. 5 is a diagram showing an example of small categories, classes of factors, and points to be deducted from a driving ease index, defined for traffic conditions.

FIG. 6 is a diagram showing an example of small categories, classes of factors, and points to be deducted from a driving ease index, defined for weather conditions.

FIG. 7 is a diagram showing an example of classification of road structural factors of a driving environment.

FIG. 8 is a diagram showing an example of the relationship between the basic scores calculated based on the road structural factors and the ranks of driving ease.

FIG. 11 is a diagram showing an example of a driving ease index and its associated information registered in an index database.

FIG. 13 is a diagram showing the relationship between the driving ease indices and the driving ease levels defined stepwise corresponding to the driving ease indices.

FIG. 20 is a diagram showing an example of process steps of presenting a driving environment using a driving environment evaluation system, a driving environment evaluation method, a driver assistance system, and driving environment display device according to a second embodiment of the present invention, section (a) being a flowchart of the process steps carried out in the vehicle, and section (b) being a flowchart of an example of process steps carried out in the center.

FIG. 23 is a diagram showing an example of teacher data used for the analysis and evaluation of a driving environment in the same embodiment.

MODES FOR CARRYING OUT THE INVENTION

First Embodiment

Hereinafter, a driving environment evaluation system, a driving environment evaluation method, a driver assistance system, and a driving environment display device according to a first embodiment of the present invention will be described with reference to FIGS. 1 to 19.

Figure 1:
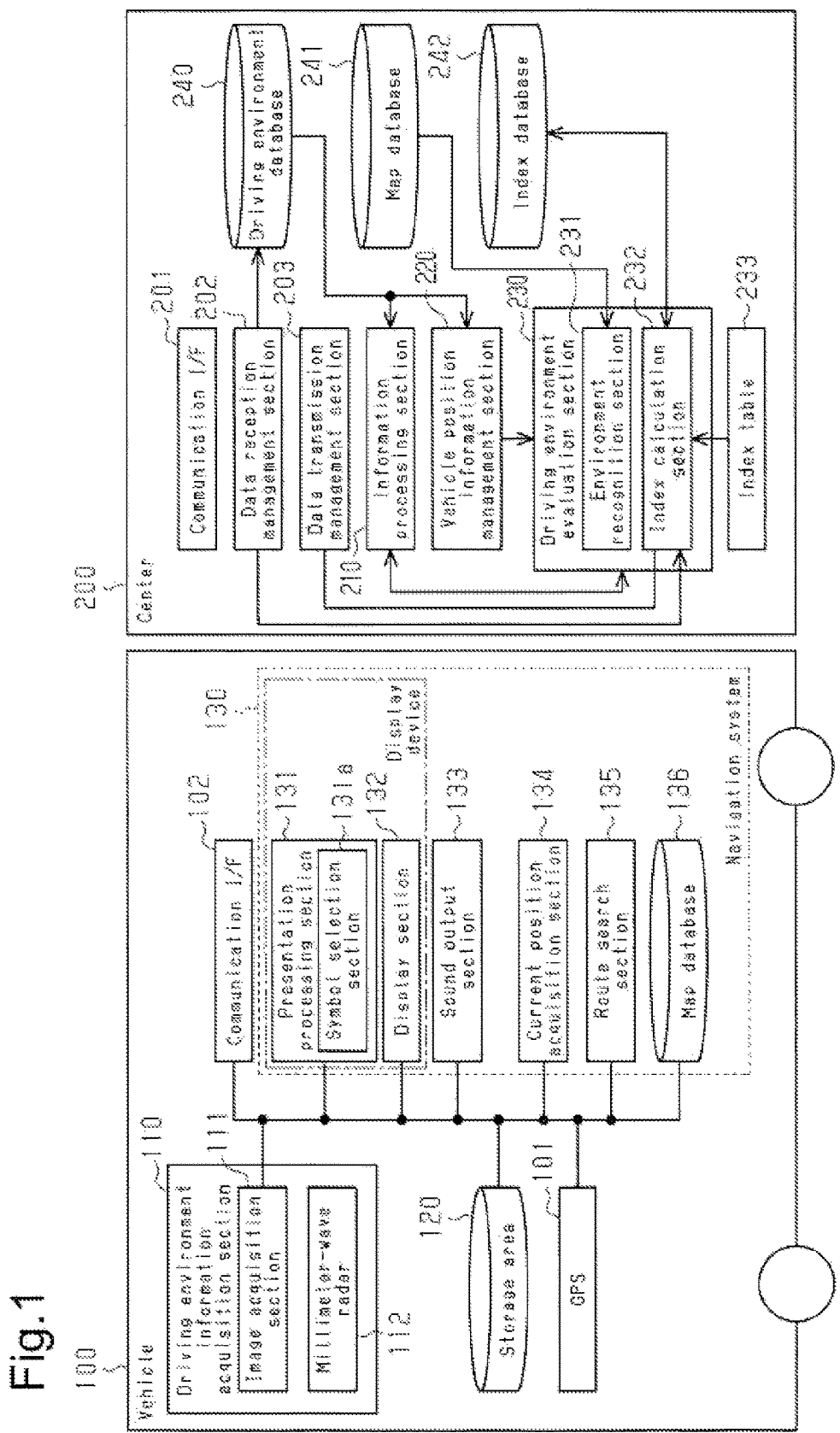
FIG. 1 is a block diagram of the general structure of a vehicle and a center, to which a driving environment evaluation system, a driving environment evaluation method, a driver assistance system, and a driving environment display device according to a first embodiment of the present invention are applied.

As shown in FIG. 1, a driving environment evaluation system, a driving environment evaluation method, a driver assistance system, and a driving environment display device of the present embodiment are applied to a vehicle 100. The vehicle 100 includes a communication I/F 102, which is a communication interface for communications with a center 200, and a driving environment information acquisition section 110, which acquires driving environment information regarding the driving environment of the vehicle 100. The driving environment information acquisition section 110 includes an image acquisition section 111, which is configured by an on-vehicle camera or the like for capturing images of the driving environment of the vehicle 100, for example. The driving environment information acquisition section 110 also includes a millimeter-wave radar 112, which detects an object present around the vehicle 100.

The communication I/F 102 sends the driving environment information acquired in the vehicle 100 to the center 200. Through communication with the center 200, the communication I/F 102 acquires, from the center 200, information that is indicative of indices of driving ease that are the evaluation results of driving ease, and information regarding influential factors identified at the center 200 in evaluation of the driving environment.

The image acquisition section 111 takes images of the front in the driving direction of the vehicle 100, for example, as information indicative of the driving environment of the vehicle 100, and stores the image data that is the result of the imaging process in a storage area 120. The millimeter-wave radar 112 detects objects present around the vehicle 100, and stores data indicating the detection results in the storage area 120. In the present embodiment, driving environment information indicative of the driving environment of the vehicle 100 is acquired in this way by the image acquisition section 111 and millimeter-wave radar 112.

A GPS 101 provided on the vehicle 100 receives GPS satellite signals that represent the absolute position of the vehicle 100. The GPS 101 then detects the position of the vehicle 100 based on the received GPS satellite signals. The GPS 101 stores data indicating the detection results in the storage area 120. The detection results of the position of the vehicle 100 are associated with the driving environment information, for example, when stored in the storage area 120.

The data stored in the storage area 120 are each sent to the center 200 by the communication I/F 102. The communication I/F 102 sends data per link as a unit. The link is a zone delimited by traffic elements such as intersections.

A navigation system 130 is mounted on the vehicle 100. The navigation system 130 includes a presentation processing section 131, which performs a presentation process for presenting various pieces of information, a display section 132, which visually displays a guide screen, and a sound output section 133 for audio guidance of various pieces of information. The navigation system 130 further includes a current position acquisition section 134, which acquires information regarding the position of the vehicle 100, and a route search section 135, which searches for a route to a set destination. The navigation system 130 also includes a map database 136 with map data registered therein. In the present embodiment, this navigation system 130 configures the driver assistance system. In the present embodiment, the presentation processing section 131 and display section 132 configure the driving environment display device.

The route search section 135 of the present embodiment acquires information indicative of the current location of the vehicle 100 from the current position acquisition section 134 when a destination is set. The route search section 135 then searches for one or more routes from the current location of the vehicle 100 to the destination. The route search section 135 sends the information that shows the route search results to the center 200 via the communication I/F 102.

The map data registered in the map database 136 is information on maps and includes map display data, route search data, and guidance data (names of intersections, roads, areas or regions, direction guidance facility information, and the like).

The presentation processing section 131 of the navigation system 130 includes a symbol selection section 131a, which selects a symbol defined correspondingly to each influential factor of a driving environment.

When information indicative of a driving ease index, which is the evaluation results of driving ease, is delivered from the center 200, the presentation processing section 131 carries out a presentation process for presenting the information to the user. In this presentation process, the driving ease indices are converted into driving ease levels, for example, which are graded into several levels.

When information indicative of an influential factor identified in the evaluation of the driving environment is delivered from the center 200, the symbol selection section 131a selects a symbol corresponding to this influential factor.

The presentation processing section 131 generates image data and sound data so as to present the converted driving ease level noted above and the symbol identified by the symbol selection section 131a in accordance with the route(s) found by the route search section 135. The presentation processing section 131 then outputs the generated image data and sound data to the display section 132 and sound output section 133, respectively. Thus, the evaluation results of driving ease of the found route(s) or the like of the vehicle 100, for example, are provided with images and voices as guidance. The selected symbol is shown as guidance by an image.

When the center 200 delivers an image taken on the way of the route for which a driving ease index has been calculated together with the information indicative of the driving ease index, the presentation processing section 131 outputs this image to the display section 132. Thus, the image of the route is displayed with the evaluation results of driving ease.

The center 200 includes a communication I/F 201, which is a communication interface for communications with the communication I/F 102 or the like of the vehicle 100. The center 200 further includes a data reception management section 202, which manages reception of data by the communication I/F 201, and a data transmission management section 203, which manages transmission of data by the communication I/F 201. The center 200 further includes an information processing section 210, which processes driving environment information acquired from the vehicle 100 or the like, a vehicle position information management section 220, which manages position information of the vehicle 100 or the like, and a driving environment evaluation section 230, which evaluates the driving ease of a road based on the driving environment information.

The communication I/F 201 establishes communications with several vehicles including the vehicle 100 and information terminals. The communication I/F 201 also establishes communications with the road traffic information center that manages road traffic information such as the information on congestion, constructions, accidents and the like, and weather information such as the information regarding the weather of the driving areas, earthquake notifications and the like.

When the communication I/F 201 receives driving environment information sent from the communication I/F 102 or the like of the vehicle 100, the data reception management section 202 outputs this driving environment information to the driving environment database 240. When the communication I/F 201 receives information indicative of route search results of the vehicle 100, for example, the data reception management section 202 outputs this information to the driving environment evaluation section 230.

When the communication I/F 201 receives road traffic information from the road traffic information center, the data reception management section 202 outputs this road traffic information to the driving environment evaluation section 230.

When the driving environment evaluation section 230 evaluates the driving ease of a road based on the driving environment information, the data transmission management section 203 determines a delivery destination of the information indicative of the evaluation results. The data transmission management section 203 then delivers the information indicative of the evaluation results to the selected delivery destination via the communication I/F 201.

The information processing section 210 extracts driving environment information from the driving environment database 240 and performs the process of analyzing the driving environment information. If the driving environment information includes image data acquired by the image acquisition section 111, for example, the information processing section 210 analyzes this image data. The information processing section 210 then identifies a road environment, and traffic and weather conditions that the image data indicates, and outputs the identification results to the driving environment evaluation section 230.

When the driving environment information includes detection results acquired by the millimeter-wave radar 112, the information processing section 210 determines a presence or absence of pedestrians, other vehicles, and obstacles around the vehicle 100, for example, based on the detection results of the millimeter-wave radar 112. The information processing section 210 then outputs the determination results to the driving environment evaluation section 230.

The vehicle position information management section 220 identifies the position of the vehicle that is the source of the driving environment information based on the position information associated with the driving environment information processed by the information processing section 210. The vehicle position information management section 220 then outputs the identification results to the driving environment evaluation section 230.

The driving environment evaluation section 230 includes an environment recognition section 231, which recognizes a driving environment based on the processing results of the information processing section 210, and an index calculation section 232, which quantitatively evaluates a driving environment based on the recognition results of the environment recognition section 231.

When processing results of the information processing section 210 are input, the environment recognition section 231 analyzes the situation the driving environment information indicates for each of the specified categories. The environment recognition section 231 of the present embodiment analyzes the driving environment information, for example, for each of the categories defined for each of the road environment, the traffic condition, and the weather condition. The environment recognition section 231 then outputs the analysis results to the index calculation section 232.

When road traffic information is input from the data reception management section 202, the environment recognition section 231 analyzes this road traffic information as the driving environment information for each of the categories defined for each of the road environment, the traffic condition, and the weather condition. The environment recognition section 231 then outputs the analysis results based on the road traffic information to the index calculation section 232.

Under the categories of the road environment, various factors that affect the road view are defined, such as installation conditions of utility poles, parked bicycles or outdoor stalls occupying part of the road, parked cars, road construction, and layout of buildings. Under the categories of the traffic condition, various factors that affect the driving ease are defined, such as the number and nature of pedestrians and cyclists (whether they avoid vehicles or not), and the ratio of large vehicles or route buses. Further, under the categories of the weather condition, various factors that obstruct sight, such as sunlight ahead, severe rainstorm, snowstorm, dense fog, factors that affect driving operation such as gale and road ice, and various factors such as weather conditions including rainfall and snowfall, are defined. In the present embodiment, these categories correspond to the influential factors used for the selection of the symbols mentioned above.

The index calculation section 232 identifies the road structure of the driving zone of various vehicles based on the map data registered in the map database 241 and the information indicating the positions of various vehicles input from the vehicle position information management section 220. The map data registered in the map database 241 is information on maps and includes map display data, route search data, and guidance data (names of intersections, roads, areas or regions, direction guidance facility information, and the like).

When analysis results are input from the environment recognition section 231, the index calculation section 232 refers to an index table 233 and calculates an index for each of the categories defined for each of the road environment, the traffic condition, and the weather condition. Several categories are defined for each of the road structural factor, the road environment, the traffic condition, and the weather condition in the index table 233. An index is defined for each of the categories for enabling quantitative evaluation of the driving environment. When information indicating road structural factors of each driving zone is input, the index calculation section 232 refers to the index table 233 and calculates an index for each of the categories defined for the road structural factors. The index calculation section 232 of the present embodiment calculates these indices for each of the links, for example. The index calculation section 232 determines one or more of the categories for which the index exceeds a specified value, for example, as influential factor(s) to be used for the selection of the symbols.

Once the index calculation section 232 calculates an index of each of the road structural factor, the road environment, the traffic condition, and the weather condition, then the section subtracts each of the indices for the road environment, the traffic condition, and the weather condition from the index of the road structural factor, for example. Thus, an index of driving ease is calculated for each link. The index calculation section 232 then stores these calculated indices of driving ease for each link for example in the index database 242. The index calculation section 232 also associates the stored indices of driving ease with the information indicating the influential factors determined in calculating these indices of driving ease as mentioned above.

When the data reception management section 202 receives information indicating one or more routes found by the route search section 135 from the communication I/F 102 of the vehicle 100, for example, the data reception management section outputs this information to the index calculation section 232.

When the information indicating a route is input, the index calculation section 232 identifies the indices of driving ease of each of the links contained in this route by referring to the index database 242. The index calculation section 232 then calculates an index of driving ease of this route. The index calculation section 232 also identifies the influential factors in this route based on the information indicating the influential factors associated with the indices of driving ease.

If the route search section 135 has found several routes, the index calculation section 232 calculates an index of driving ease for each of the routes. The index database 242 outputs the calculated driving ease indices and the information indicating the influential factors to the data transmission management section 203.

When the calculated indices of driving ease and the information indicating the influential factors are input, the data transmission management section 203 delivers the information to the communication I/F 102 of the vehicle 100 from which the route search results have been sent. If the driving environment database 240 includes an image of the route for which the driving ease index has been calculated, the data transmission management section 203 sends this image to the communication I/F 102 of the vehicle 100, too. Thus, the driving ease index and the symbols corresponding to the influential factors are shown as guidance by the display section 132 or the sound output section 133 on the vehicle 100.

Next, one example of the index table 233 will be described in detail with reference to FIGS. 2 to 6. FIGS. 2 and 3 show the contents of a table related to the road environment. FIGS. 4 and 5 show the contents of a table related to the traffic condition. FIG. 6 shows the contents of a table related to the weather condition.

As shown in FIGS. 2 and 3, the road environment is grouped into small categories of "road width," "sight," "speed," "risk," "decision," and "operation". The road environment, the traffic condition, and the weather condition are the large categories. "Road width," "speed," and "risk" of the small categories are each divided into classes of factors of "road structure" and "non-road structure". "Sight" is divided into classes of factors of "road structure," "non-road structure," and "time of day". The "road structure" is generally identified based on the road traffic information, as well as on the position information of various vehicles managed by the vehicle position information management section 220 and map data stored in the map database 241. On the other hand, the "non-road structure" is generally identified based on the analysis of an image, for example, taken by the image acquisition section 111 of the vehicle 100.

The small category "road width" shown in FIG. 2 is a class of the road environment for evaluating difficulty of driving due to the width of the road, and divided into "road structure" related to the structures of the road itself, and "non-road structure" that are factors other than the road structures.

For example, when a "road structure" in the small category "road width" is a single-lane road, it is deemed that the degree of driving difficulty is high since it is difficult to take over a preceding vehicle, and thus points are to be deducted from the driving ease index. Points are deducted by up to a maximum of P21, which is specified as deduction points, for example. The number of lanes is identified, for example, based on the position information of various vehicles managed by the vehicle position information management section 220 and map data stored in the map database 241. It can also be identified based on the analysis of an image taken by the image acquisition section 111 of the vehicle 100.

When, for example, a "non-road structure" of the small category "road width" is a multiple-lane road with at least one lane thereof being closed due to a construction or an accident, it is deemed that degree of driving difficulty is high since the road width is changed and reduced on the way, and thus points are to be deducted from the driving ease index. Points are deducted by up to a maximum of P22, which is specified as deduction points, for example. Lane closure due to a construction or an accident is determined, for example, based on the road traffic information, or the analysis of an image taken by the image acquisition section 111 of the vehicle 100.

The small category "sight" shown in FIG. 2 is a class of the road environment for evaluating difficulty of driving due to factors that affect the sight, and divided into three classes of factors of "road structure," "time of day," and "non-road structure".

For example, when a "road structure" of the small category "sight" is a single-tube tunnel with two-way traffic, it is deemed that the degree of driving difficulty is high because of the adverse effects of the headlights of oncoming vehicles on the driver's sight, and thus points are to be deducted from the driving ease index. Points are deducted by up to a maximum of P23, which is specified as deduction points, for example.

If, for example, a "time of day" of the small category "sight" is a night time period, it is deemed that the degree of driving difficulty is high since the road environment is dark and the sight is poor in an unlit road, and thus points are to be deducted from the driving ease index. Points are deducted by up to a maximum of P24, which is specified as deduction points, for example. The points to be deducted from the driving ease index can be set freely. These deduction points are values set, for example, based on empirical data or based on the feelings of a certain number of drivers.

How and where tunnels and street lamps, which are road structures, are set up are determined, for example, based on the road traffic information, as well as on the position information of various vehicles managed by the vehicle position information management section 220 and map data stored in the map database 241.

If a "non-road structure" of the small category "sight" is a presence of other vehicles parked on the road, it is deemed that the degree of driving difficulty is high since these other vehicles block part of the sight, and thus points are to be deducted from the driving ease index. Points are deducted by up to a maximum of P25, which is specified as deduction points, for example. If or how cars are parked on the road are determined, for example, based on the analysis of an image taken by the image acquisition section 111 of the vehicle 100.

The small category "speed" shown in FIG. 2 is a class of the road environment for evaluating difficulty of driving due to factors that change or limit the driving speed, and divided into "road structure" and "non-road structure".

If, for example, a "road structure" of the small category "speed" is a presence of several stop signs within a predetermined driving zone, it is deemed that the degree of driving difficulty is high since the driver is required to stop at every stop sign, and thus points are to be deducted from the driving ease index. Points are deducted by up to a maximum of P26, which is specified as deduction points, for example.

If, for example, a "non-road structure" of the small category "speed" is a route where buses frequently run or a route dedicated to buses, it is deemed that the degree of driving difficulty is high since the driver is required to reduce speed or stop at bus stops and the traffic flow changes, and thus points are to be deducted from the driving ease index. Points are deducted by up to a maximum of P27, which is specified as deduction points, for example.

The small category "risk" defined for the road environment shown in FIG. 3 is a class of the road environment for evaluating difficulty of driving due to risk factors, and, as classes of factors, "road structure" and "non-road structure" are defined, for example.

If, for example, a "road structure" of the small category "risk" is an absence of guide rails between the sidewalk and the traffic vehicle lanes, it is deemed that the degree of driving difficulty is high because of the high risk or the high possibility of contact between a (traffic disadvantaged) pedestrian and the vehicle, and thus points are to be deducted from the driving ease index. Points are deducted by up to a maximum of P31, which is specified as deduction points, for example.

In contrast, if there are guardrails, then it is deemed that the degree of driving ease is high because of the low risk or the low possibility of contact between the pedestrian and the vehicle, and thus points are to be added to the driving ease index. Points are added by up to a maximum of P31 which is adding points, for example.

How and where guardrails that are a road structure are set up are determined, for example, based on the road traffic information, as well as on the position information of various vehicles managed by the vehicle position information management section 220 and map data stored in the map database 241.

If, for example, a "non-road structure" of the small category "risk" is a heap of fallen leaves or other objects on the road, points are to be deducted from the driving ease index, since the road with such a heap of objects is hard to drive along. Points are deducted by up to a maximum of P32, which is specified as deduction points, for example.

A non-road structure such as accumulated objects or the like is identified, for example, based on the analysis of an image taken by the image acquisition section 111 of the vehicle 100.

The small category "decision" shown in FIG. 3 is a class of the road environment for evaluating difficulty of driving based on factors that cause the driver to make a decision as to whether or not a specific driving operation is required, and, as a class of factors, "road structure" only is defined, for example.

If, for example, a "road structure" of the small category "decision" is a presence of a road where the lane direction changes depending on the time of day, it is deemed that the degree of driving difficulty is high since the driver is required to decide on which lane he/her should drive, and thus points are to be deducted from the driving ease index. Points are deducted by up to a maximum of P33, which is specified as deduction points, for example.

The small category "operation" shown in FIG. 3 is a class of the road environment for evaluating difficulty of driving due to factors that require a specific driving operation, and, as a class of factors, "road structure" only is defined, for example.

If, for example, a "road structure" of the small category "operation" is a presence of road irregularities, it is deemed that the degree of driving difficulty is high because of the need for a steering wheel operation to avoid these irregularities or because of the need for a deceleration operation due to these irregularities, and thus points are to be deducted from the driving ease index. Points are deducted by up to a maximum of P34, which is specified as deduction points, for example.

As shown in FIGS. 4 and 5, the traffic condition is grouped into small categories of "movable body," "sight," "speed," "risk," "decision," and "operation". "Movable body," "speed," "decision," and "operation" of these small categories are each divided into classes of factors of "nature of movable body" and "site-related characteristics". "Sight" is divided into classes of factors of "nature of movable body" and "time of day." "Risk" is divided into classes of factors of "nature of vehicle," "nature of movable body," and "site-related characteristics."

The small category "movable body" shown in FIG. 4 is a class of the traffic condition for evaluating difficulty of driving due to the presence of a movable body such as a pedestrian, and divided into "nature of movable body," which is a factor dependent on the nature of the movable body, and "site-related characteristics," which are factors dependent on the nature of the site.

If, for example, the "nature of movable body" of the small category "movable body" indicates instability of a movable body such as a pedestrian, it is deemed that the degree of driving difficulty is high since a driving operation for avoiding this movable body is required, and thus points are to be deducted from the driving ease index. Points are deducted by up to a maximum of P41, which is specified as deduction points for example. The "nature of movable body" such as instability of a movable body such as a pedestrian is determined, for example, based on the analysis of an image taken by the image acquisition section 111 of the vehicle 100, or on the detection results of the millimeter-wave radar 112.

If, for example, the "site-related characteristics" of the small category "movable body" is a group of school children (students), for example, in a school area on their way to or from school, the driver is required to drive with attention to the children, because school children on their way to or from school during this time period may act unexpectedly. This category is deemed accordingly to have a high degree of driving difficulty and points are to be deducted from the driving ease index. Points are deducted by up to a maximum of P42, which is specified as deduction points, for example. The presence of such school children in a school area on their way to or from school is determined based on a detection of school children on their way to or from school as a result of the analysis, for example, of an image taken by the image acquisition section 111 of the vehicle 100. Whether or not there are children on their way to or from school in a school area is determined, for example, based on whether or not the driving positions of various vehicles managed by the vehicle position information management section 220 are near an establishment such as a primary school.

The small category "risk" shown in FIG. 5 is a class for evaluating difficulty of driving due to factors of the traffic condition, and divided into three classes of factors of "nature of vehicle," "nature of movable body," and "site-related characteristics."

The "nature of vehicle" is a category for evaluating difficulty of driving due to the nature of other vehicles. For example, a road with many large vehicles is deemed to have a high degree of driving difficulty because of the high stress of driving behind a large vehicle, and points are to be deducted from the driving ease index. Points are deducted by up to a maximum of P51, which is specified as deduction points, for example.

Such nature of the vehicle is determined, for example, based on whether or not an image of a specific vehicle such as a large vehicle is included in the image taken by the image acquisition section 111 of the vehicle 100. Whether or not a vehicle is driven by a beginner driver is determined, for example, based on whether or not an image of the beginner driver symbol is included in the image taken by the image acquisition section 111 of the vehicle 100.

As shown in FIG. 6, the weather condition is further divided into small categories of "sight," "risk," "decision," and "operation." "Sight" of these small categories is divided into classes of factors of "site-related characteristics," "phenomenon," and "hazard." "Risk" is divided into classes of factors of "phenomenon" and "hazard." "Decision" is classified under a class of factors "hazard," and "operation" is classified under a class of factors "site-related characteristics."

The small category "site-related characteristics" shown in FIG. 6 is a class of factors of the weather condition that results from local characteristics or the like of the driving area. For example, if the sun is ahead of the vehicle in the driving direction at a specific time of day, the environment is deemed to have a high degree of driving difficulty since the driver's sight becomes poor, and thus points are to be deducted from the driving ease index. Points are deducted by up to a maximum of P61, which is specified as deduction points, for example. Whether or not the sun is ahead of the vehicle in the driving direction is determined based on the relationship between the road alignments indicated by the map data registered in the map database 241 and the sunlight characteristics, and the image taken by the image acquisition section 111 of the vehicle 100.

If, for example, the "phenomenon" of the small category "risk" is rain or snow, it is deemed that the degree of driving difficulty is high since the road is slippery, and thus points are to be deducted from the driving ease index. Points are deducted by up to a maximum of P62, which is specified as deduction points, for example. Weather phenomena such as rain or snow are determined based on the weather information input from the data reception management section 202, information collected from various vehicles indicating an operating condition of a wiper, and the image taking results or the like of the image acquisition section 111.

As shown in FIG. 7, the road structural factors are static factors related to the roads themselves and are divided into such categories as the type of road, the number of lanes, the layout of sidewalks, the layout of road shoulders, the road width, and the gradient. The type of road is classified into highways, national roads, prefectural roads, and forest roads, for example. The number of lanes is classified according to the number of lanes, for example. The layout of sidewalks is classified by presence or absence of sidewalks and by each width of the sidewalks, for example. The layout of road shoulders is classified by predetermined widths, and the road width is classified by predetermined widths.

In the present embodiment, as shown in FIG. 8, in calculating the driving ease indices, the driving ease is ranked based on the categories of the road structural factors. In the example here, for example, one of the five ranks S, A, B, C, and D is given based on the categories of the road structural factors of the road, for which the driving ease index is calculated. Scores 120, 100, 80, 60, and 40 are each assigned to the ranks S, A, B, C, and D, so that the road that is given one of the ranks has a score to be used as the basis for the calculation of the driving ease index. Such ranking is done for each link as one unit, for example. This method of calculating driving ease indices according to road structural factors is based on Document No. 576 issued by the National Institute for Land and Infrastructure Management.

Figure 9:
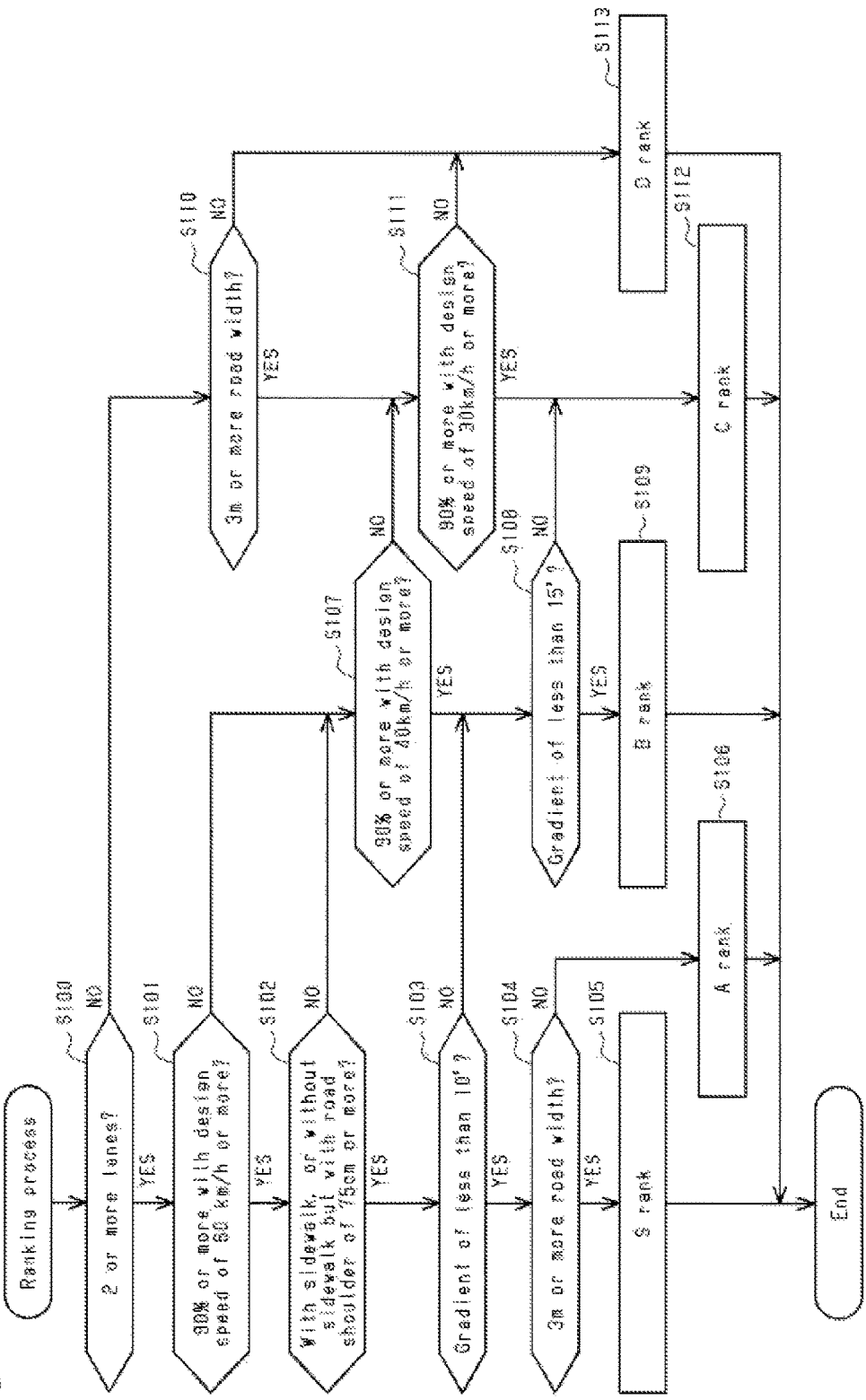
FIG. 9 is a flowchart showing an example of process steps of calculating basic scores.

As illustrated in FIG. 9, in ranking a road, the road structural factors are determined in each category based on the map data registered in the map database 241. At step S100, for example, it is determined whether or not the number of lanes is two or more. If the number of lanes is two or more (YES at step S100), it is determined whether or not 90% or more of each link or links is taken up by a zone with a preset speed of 60 km/h or more, which is a speed regarded as suitable for driving the road (step S101). If it is determined that 90% or more of the link is a zone with such a speed (YES at step S101), presence or absence of a sidewalk, and the road shoulder width are determined (step S102).

At step S102, if it is determined that there is a sidewalk, or, that although there is no sidewalk, the road shoulder is 75 cm wide or more (YES at step S102), it is determined, for example, whether or not the gradient is less than 10 degrees (step S103). If the gradient is less than 10 degrees (YES at step S103), it is determined whether or not the road width is 3 m or more (step S104).

If the road width is 3 m or more (YES at step S104), this target road is determined to be an S rank road (step S105).

On the other hand, if the road width is less than 3 m (NO at step S104), this target road is determined to be an A rank road (step S106).

At step S102, if it is determined that there is no sidewalk, or, that although there is a sidewalk, the road shoulder width is less than 75 cm (NO at step S102), it is determined whether or not 90% or more of each link is taken up by a zone with a preset speed of 40 km/h or more at step S107. Similarly, if it is determined at step S103 that the gradient is 10 degrees or more (NO at step S103), it is determined whether or not 90% or more of each link is taken up by a zone with a preset speed of 40 km/h or more at step S107. If 90% or more of the link is a zone with a preset speed of 40 km/h or more (YES at step S107), it is determined whether or not the gradient is less than 15 degrees (step S108).

If the gradient is less than 15 degrees (YES at step S108), the target road is determined to be a B rank road (step S109).

On the other hand, if the gradient is 15 degrees or more (NO at step S108), the target road is determined to be a C rank road (step S112).

If it is determined at step S107 that less than 90% of the link is taken up by a zone with a preset speed of 40 km/h or more, it is further determined whether or not 90% or more of the link is taken up by a zone with a preset speed of 30 km/h or more (step S111). If 90% or more of the link is a zone with a preset speed of 30 km/h or more (YES at step S111), the target road is determined to be a C rank road (step S112).

If less than 90% of the link is taken up by a zone with a preset speed of 30 km/h or more (NO at step S111), the target road is determined to be a D rank road (step S113).

If the number of lanes is determined to be one at step S100 (NO at step S100), it is determined whether or not the road width is 3 m or more at step S110. If the road width is 3 m or more (YES at step S110), this target road is determined to be either a C rank road or a D rank road through the process steps of S111, S112, and S113 described above.

If the road width is less than 3 m (NO at step S110), the target road is determined to be a D rank road (step S113).

Figure 10:
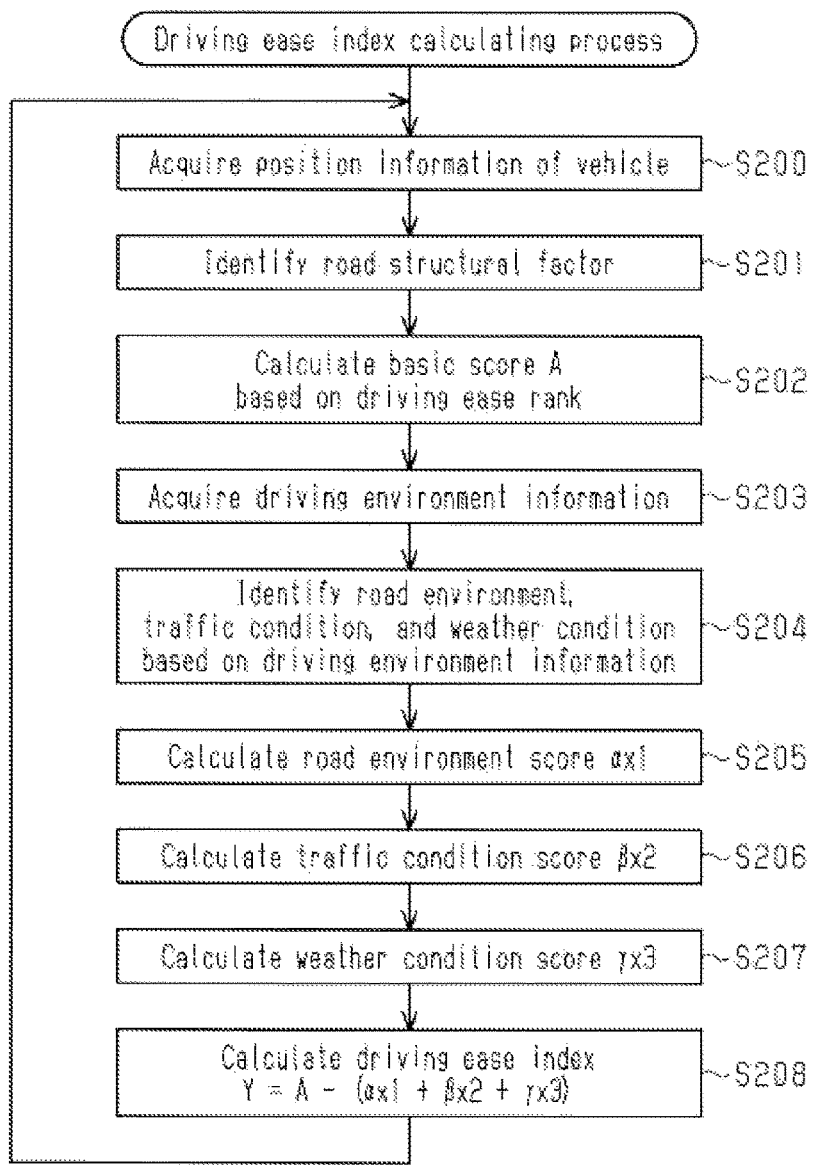
FIG. 10 is a flowchart showing an example of process steps of calculating driving ease indices.

In calculating the driving ease index, as shown in FIG. 10, the driving environment evaluation section 230 acquires position information of various vehicles, which are the sources of driving environment information, from the vehicle position information management section 220 (step S200). Next, the driving environment evaluation section 230 refers to the map data registered in the map database 241 based on the acquired position information of various vehicles and identifies the road structural factors (step S201). Thus, the road structural factors such as those examples in FIG. 7 described above are identified for each link, for example.

Next, the ranking process steps as previously shown in the example of FIG. 9 are carried out and a rank is given based on the road structural factors. A basic score A is then calculated corresponding to each rank as shown in the example of FIG. 8 (step S202 in FIG. 10).

Once a basic score is calculated, the driving environment information registered in the driving environment database 240 is acquired (step S203). The driving environment information thus acquired is then analyzed to identify a road environment, a traffic condition, and a weather condition, for example for each link (step S204).

A road environment score $\alpha x1$ is then calculated (step S205), which is a quantified value of minus factors of the road environment, as a result of the evaluation of each category of the identified road environment, where the value $\alpha$ is a coefficient and $x1$ is a total sum of deduction points for the road environment. A traffic condition score $\beta x2$ is calculated (step S206), which is a quantified value of minus factors of the traffic condition, as a result of the evaluation of each category of the identified traffic condition. A weather condition score $\gamma x3$ is calculated (step S207), which is a quantified value of minus factors of the weather condition, as a result of the evaluation of each category of the identified weather condition. The values β and γ are coefficients, and x2 and x3 are the total sums of deduction points for the traffic condition and the weather condition, respectively.

Next, the road environment score αx1, the traffic condition score βx2, and the weather condition score γx3 are each deducted from the basic score A, which was calculated based on the driving ease rank (step S208). Thus, a driving ease index Y of each link is calculated.

Consequently, as illustrated in FIG. 11, the driving ease index 45 is calculated, by subtracting 15, which is a quantified minus factor of the road environment, 10, which is a quantified minus factor of the traffic condition, and 10, which is the quantified minus factor of the weather condition, from the basic score 80.

Next, an ID is assigned so as to manage this calculated driving ease index, and this driving ease index is entered in the index database 242. When entered, the driving ease index is associated with, for example, coordinate information indicative of the position of the road that was evaluated with the driving ease index, the link name, the date and time when the driving environment information was acquired, the file name of the driving environment information, and information on driving ease factors.

Next, the process steps for displaying the driving ease index will be explained with reference to FIG. 12.

Figure 12:
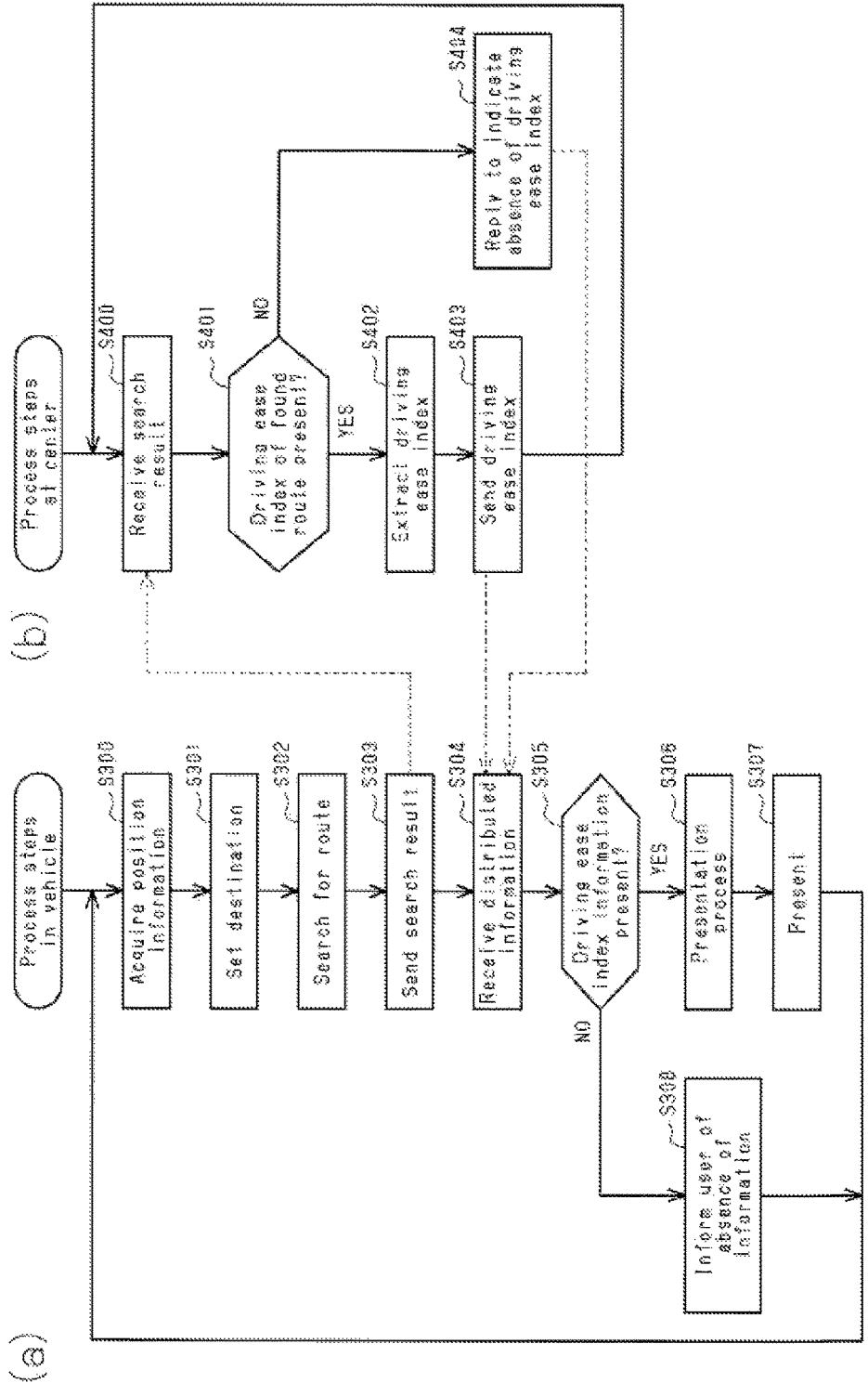
FIG. 12 is a diagram showing an example of process steps of presenting a driving environment, section (a) being a flowchart of the process steps carried out in the vehicle, and section (b) being a flowchart of an example of process steps carried out in the center.

As shown in section (a) of FIG. 12, when position information is acquired at the vehicle 100 where the driving ease index is to be displayed, and a destination is set through the navigation system 130, a route from the current location indicated by the position information to the destination is searched for (steps S300 to S302). The information indicating the search results are sent from the vehicle 100 to the center 200 (step S303). In response to the search results thus sent, the center 200 delivers information indicating evaluation results of the found route.

Next, when the communication I/F 102 of the vehicle 100 receives the information delivered from the center 200, it is determined whether or not this information contains information related to the driving ease index (steps S304 and S305). If the delivered information contains information related to the driving ease index (YES at step S305), the presentation process is carried out for presenting this driving ease index (step S306). Through this presentation process, the driving ease index is converted to a driving ease level, which is defined as one of several ranks, for example. Next, the driving ease level converted from the driving ease index is visually displayed in the display section 132 (step S307). The driving ease level converted from the driving ease index is also played in a voice as guidance by the sound output section 133.

If the information delivered from the center 200 does not contain information related to the driving ease index (NO at step S305), the user is notified of an absence of the driving ease index of the found route at the center 200 (step S308).

When the center 200 receives search results of routes sent from the vehicle 100, as shown in step S400 in section (b) of FIG. 12, it is determined whether or not a driving ease index of the route indicated by the search results exists in the index database 242 (step S401).

If there is a driving ease index in the index database 242 (YES at step S401), information indicating this driving ease index is extracted from the index database 242 (step S402). Next, the extracted information indicating the driving ease index is sent to the vehicle 100 that has sent the search results (step S403).

If there is no driving ease index in the index database 242 (NO at step S401), information indicating the "absence" of an applicable driving ease index is sent to the vehicle 100 that has sent the search results (step S404).

Hereinafter, one form of displaying the evaluation results of a driving environment by way of the driving environment evaluation system, the driving environment evaluation method, the driver assistance system, and the driving environment display device according to the present embodiment will be described with reference to FIGS. 13 to 17.

As shown in FIG. 13, a level of driving ease (easiness level) is defined for each of predetermined ranges of driving ease indices calculated with the expression $(Y=A-(\alpha x1+\beta x2+\gamma x3))$ at step S208 of previously described FIG. 10. Specifically, five levels, level A, level B, level C, level D, and level E, are assigned to "80 or more," "from 60 to 79 inclusive," "from 40 to 59 inclusive," "from 20 to 39 inclusive," and "19 or less," respectively.

For example, the level A is used as the evaluation results with the calculated driving ease index of 80 or more, and indicates the highest degree of driving ease of the road that is the evaluation target. In contrast, the level E is used as the evaluation results with the calculated driving ease index of 19 or less, and indicates the lowest degree of driving ease of the road that is the evaluation target.

Figure 14:
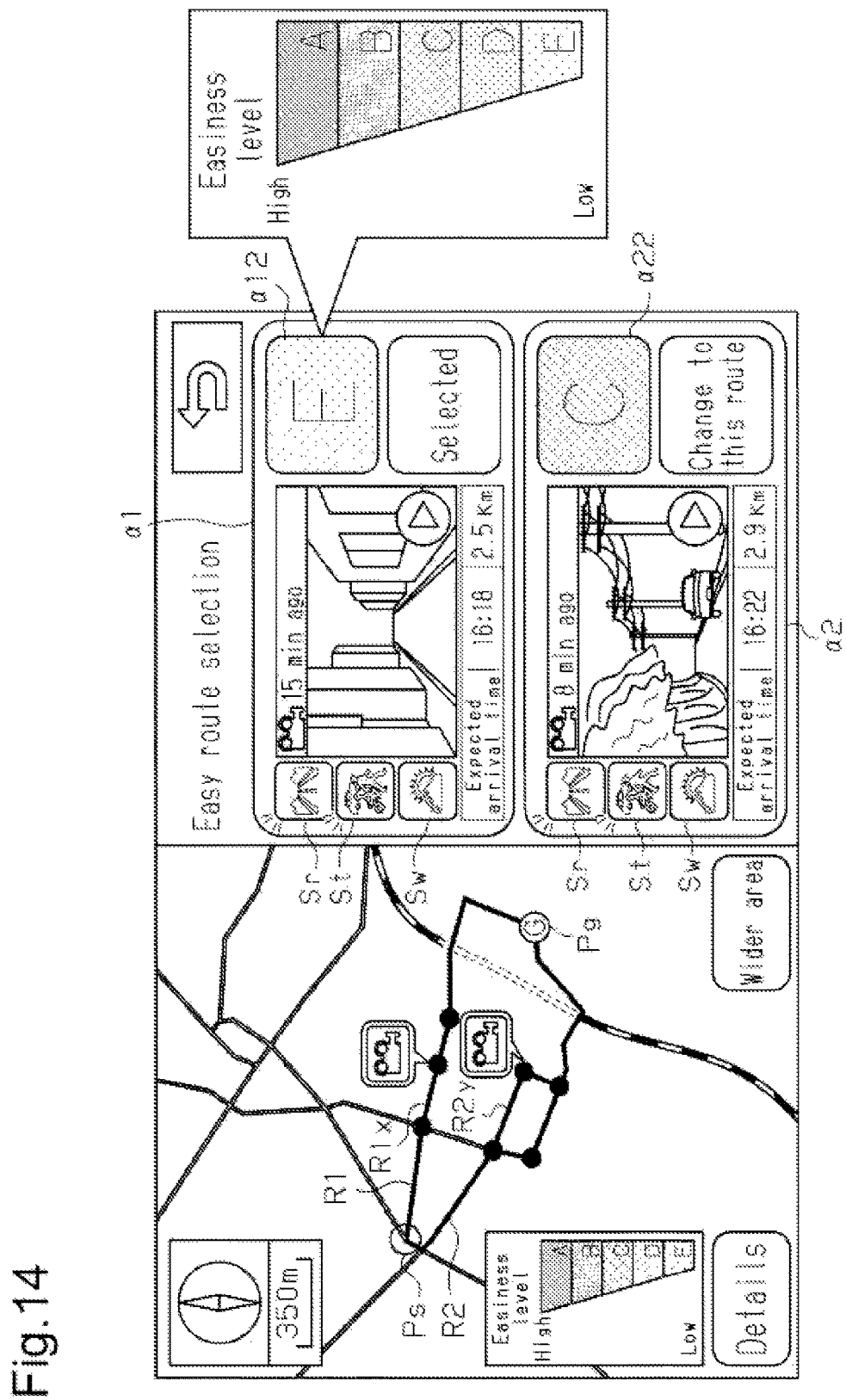
FIG. 14 is a diagram showing an example of how evaluation results of a driving environment are displayed.

As shown in FIG. 14, when two routes R1 and R2 are found as routes from a start point PS to a goal point Pg, information indicative of the driving ease of the found route R1 is displayed in an area α1 of the display section 132 of the navigation system 130. Similarly, information indicative of the driving ease of the found route R2 is displayed in an area α2 of the display section 132.

The letter E indicative of the driving ease level is displayed and lit in a color assigned to each of the five levels of driving ease in part α12 of the area α1 of the display section 132. Similarly, the letter C indicative of the driving ease level is displayed and lit in a color assigned to each of the five levels of driving ease in part α22 of the area α2 of the display section 132.

In each of the areas α1 and α2, images showing the driving environment captured by the cameras mounted on vehicles that drove part or all of the route R1 and of the route R2 are displayed.

Moreover, in the present embodiment, as shown in FIG. 14, for example, the factors that have caused the driving ease of the route R1 to be evaluated as level E are displayed. In this example, some factors related to the road environment and the traffic condition are the factors that lower the driving ease index. Therefore, of symbols Sr, St, and Sw, which respectively indicate the road environment, the traffic condition, and the weather condition, the symbols Sr and St are displayed and lit in color in the area α1. Thus, it is presented that the E rank route R1 is harder to drive along than the C rank route R2 due to the influence of the road environment and the traffic condition.

Similarly, as shown in FIG. 14, for example, the symbols Sr and St representing the road environment and the traffic condition that are the factors that have caused the driving ease of the route R2 to be evaluated as level C are displayed and lit in color in the area α2.

Figure 15:
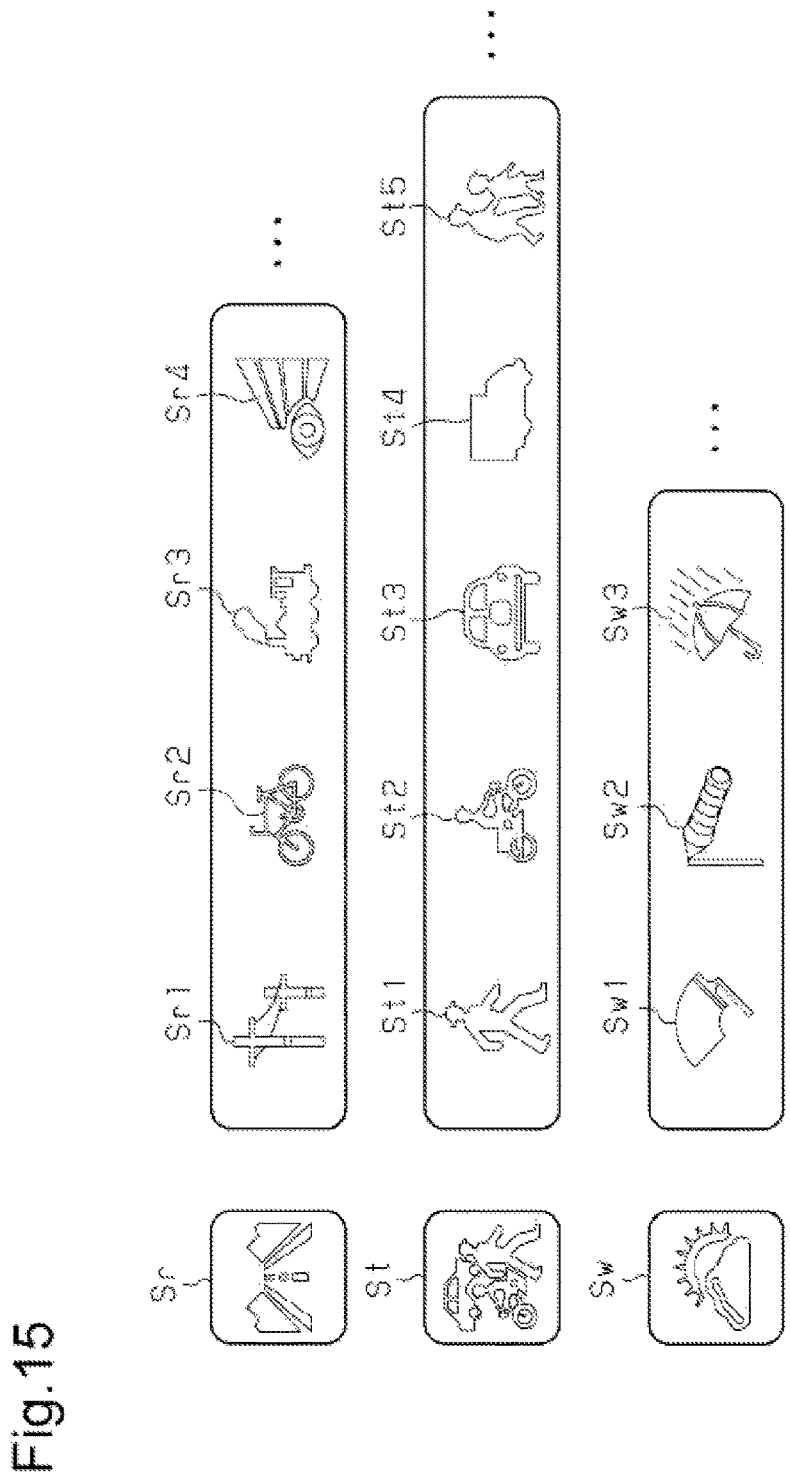
FIG. 15 is a diagram showing first symbols defined correspondingly to a road environment, a traffic condition, and a weather condition, and second symbols representing influential factors defined for each of the first symbols.

As shown in FIG. 15, in the present embodiment, moreover, other than the first symbols Sr, St, and Sw representing the road environment, the traffic condition, and the weather condition, second symbols Sr1 to Sr4, St1 to St5, and Sw1 to Sw3 are defined to indicate the factors that affect the driving ease in the factors of each category. A second symbol Sw1 indicates that the weather in the driving environment requires the operation of the wiper. A second symbol Sw3 indicates that the weather in the driving environment is in a state in which pedestrians are using umbrellas.

Figure 16:
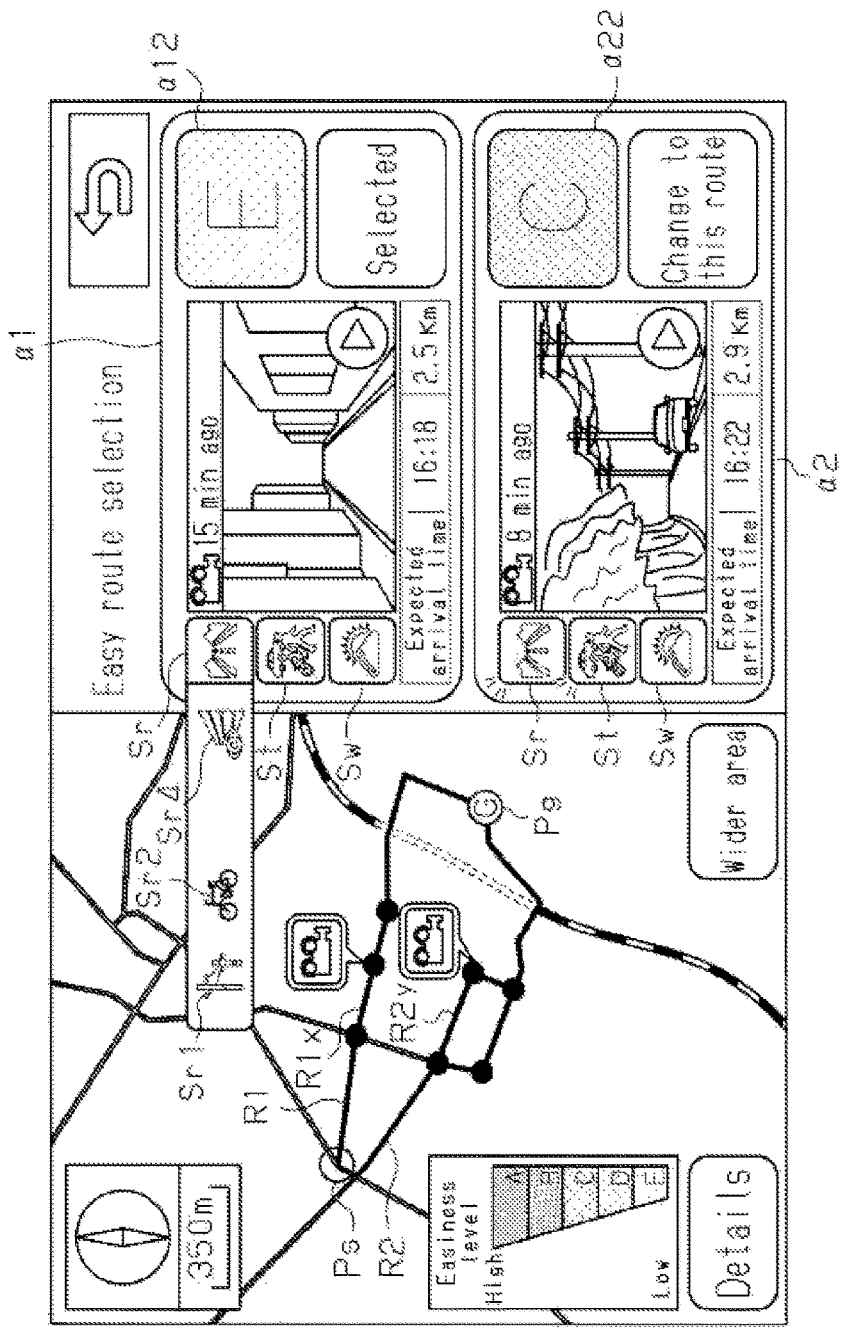
FIG. 16 is a diagram showing an example of how second symbols related to the road environment are displayed.

As shown in FIG. 16, when the symbol Sr of the route R1 displayed in the display section 132, which may be a touchscreen, for example, is touched, a symbol Sr1 indicating utility poles, a symbol Sr2 indicating parked bicycles, and a symbol Sr4 indicating visibility, which are the factors of the road environment that have reduced the driving ease, are further displayed.

Figure 17:
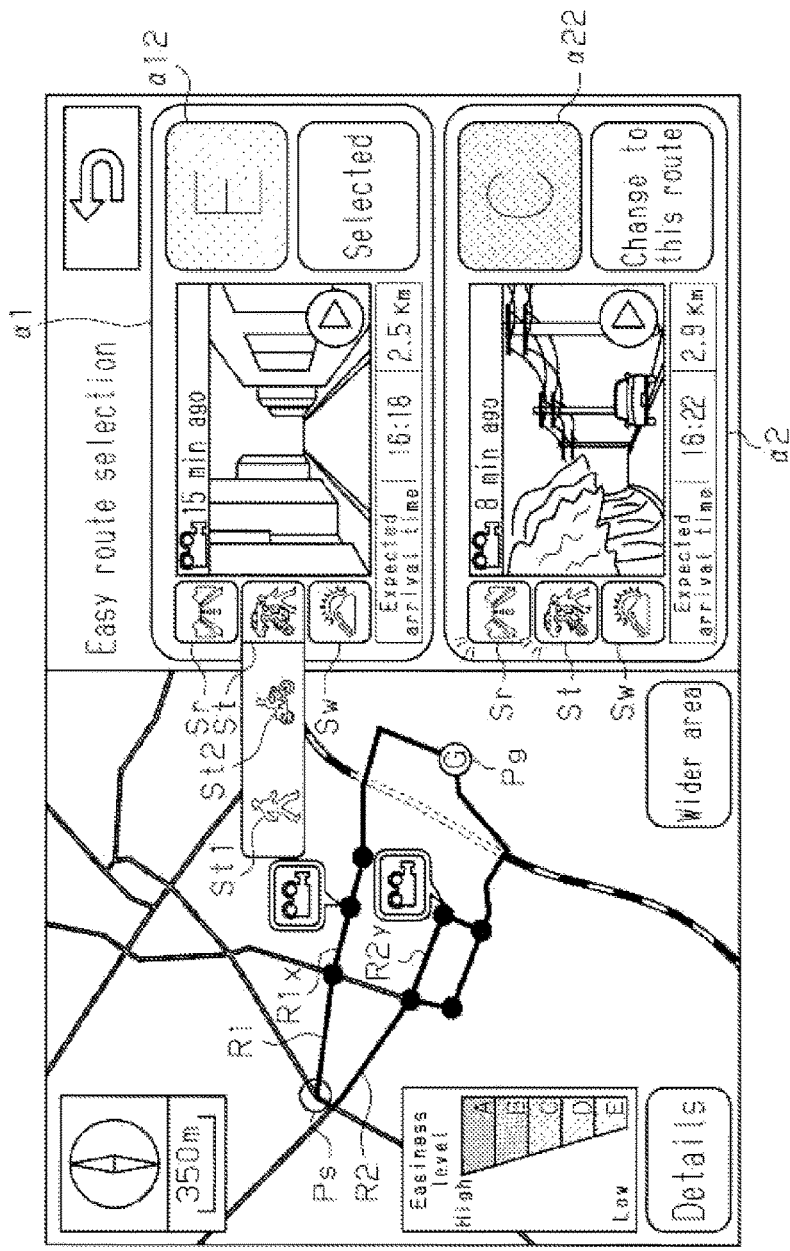
FIG. 17 is a diagram showing an example of how second symbols related to the traffic condition are displayed.

As shown in FIG. 17, when the symbol St of the route R1 displayed in the display section 132, which may be a touchscreen, for example, is touched, a symbol St1 indicating pedestrians, and a symbol St2 indicating bicycles, which are the factors of the traffic condition that have reduced the driving ease, are further displayed.

Hereinafter, the functions of the driving environment evaluation system, the driving environment evaluation method, the driver assistance system, and the driving environment display device according to the present embodiment will be summed up with reference to FIGS. 18 and 19.

Figure 18:
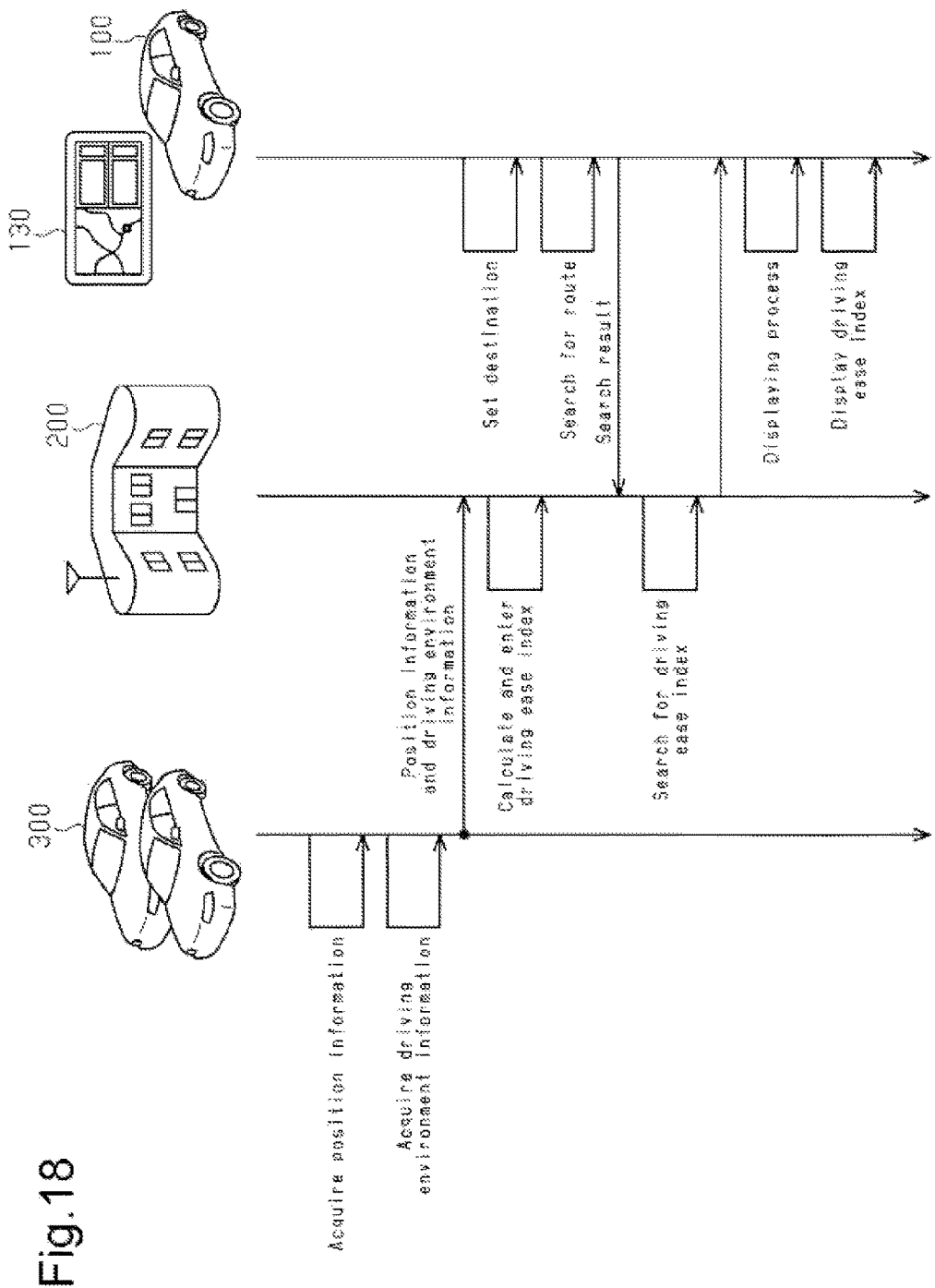
FIG. 18 is a sequence diagram showing an example of the procedures of acquiring driving environment information, evaluating the driving environment, and presenting the evaluation results.

As shown in the sequence diagram of FIG. 18, when a plurality of vehicles 300 acquire position information and driving environment information, the position information and the driving environment information are sent from each vehicle 300 to the center 200.

At the center 200, a driving ease index of each driving route is calculated based on the position information and driving environment information sent from each vehicle 300, and entered.

When one or more routes to a destination set by the navigation system 130 of the vehicle 100 are found, the information indicating the one or more routes thus found is sent from the vehicle 100 to the center 200.

When the information indicating the one or more routes is acquired, the driving ease index of the road included in this route is searched for at the center 200. Information indicating driving ease indices of the one or more routes is then delivered from the center 200 to the vehicle 100.

When the information indicating a driving ease index of the route is received, the process of displaying this information is carried out at the vehicle 100. This process converts the driving ease index to one of the rank A to rank E described above, for example. The converted rank is then displayed in the display section 132 of the navigation system 130.

Figure 19:
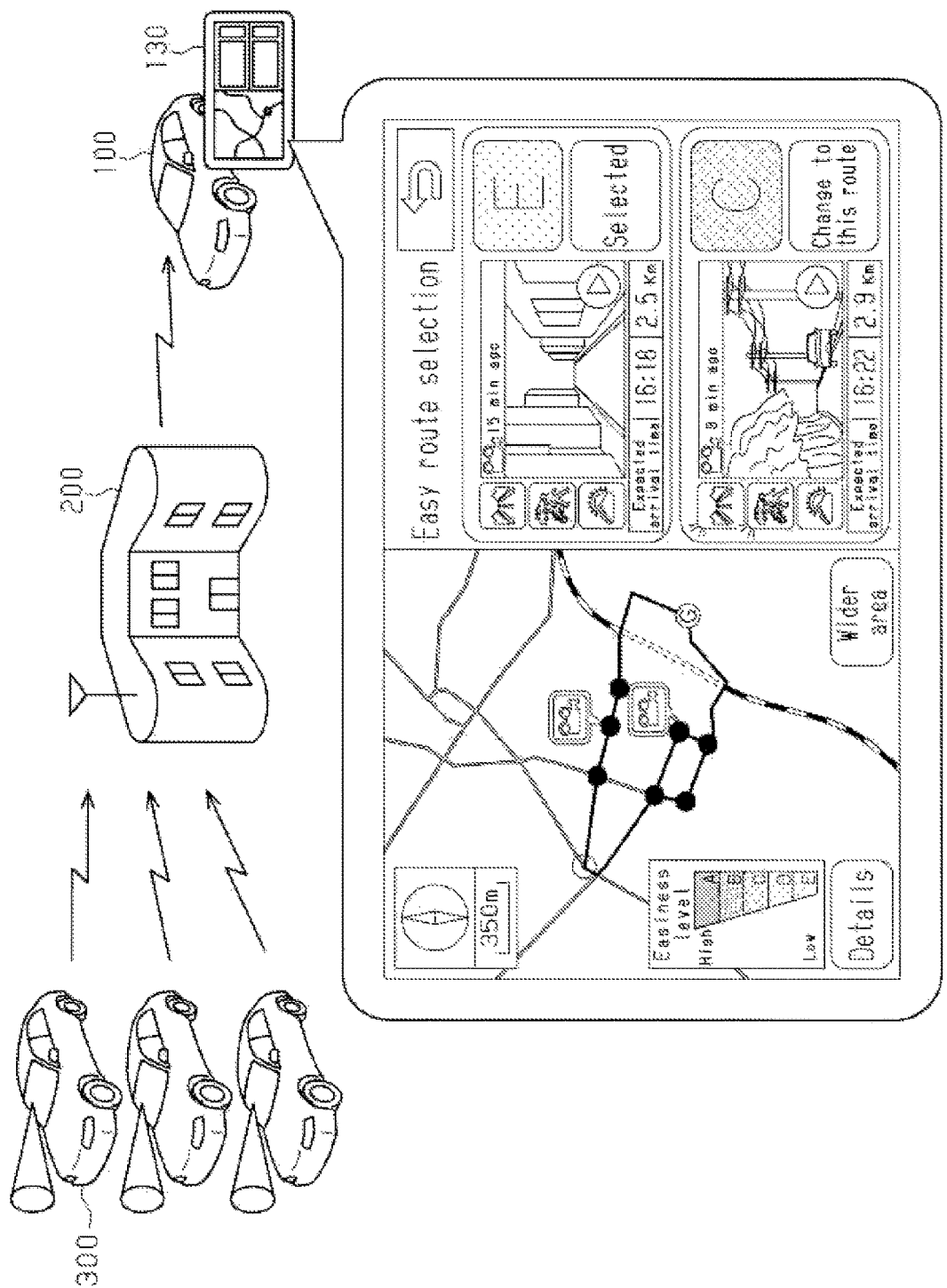
FIG. 19 is a diagram showing an example of vehicles that are sources of driving environment information, a center where the driving environment information is processed, and a vehicle that is the object for which the driving environment information is used, together with evaluation results of a driving environment.

Thus, as shown in FIG. 19, a driving ease index of each driving route is calculated based on the position information and driving environment information acquired in each vehicle 300 at the center 200. The calculated driving ease index is then delivered to the vehicle 100 in response to a request from the vehicle 100.

In the vehicle 100, the driving ease index is converted to a driving ease level, and this driving ease level is displayed in the display section 132 for each route. The driving ease level of each route is played in a voice as guidance. In this way, the route is selected based on the driving ease level, and guidance is given as to the driving ease of the route.

As described above, the driving environment evaluation system, the driving environment evaluation method, the driver assistance system, and the driving environment display device according to the present embodiment provide the following advantages.

(1) The ease of traveling of a driving environment of a movable body is quantitatively evaluated based on an analysis of driving environment information. This enables quantitative evaluation of ease of traveling by the movable body, so that quantitative information on the ease or difficulty of traveling can be provided.

(2) The driving environment information includes information on factors of a road environment, a traffic condition, and a weather condition. Therefore, the evaluation appropriately takes into consideration the factors that affect the ease of traveling.

(3) The information on the road environment, the traffic condition, and the weather condition is classified based on categories that are specified for each of factors correlated to the ease of traveling by a movable body. The analysis is made for each category as one unit. The ease of traveling is then quantitatively evaluated by integrating the analysis results given per category. Thus, the evaluation of the driving environment reflects the evaluation results of various categories defined for each of the road environment, the traffic condition, and the weather condition. Accordingly, the driving environment that is constituted by a wide variety of factors is precisely evaluated.

(4) The sources of the driving environment information are vehicles 100 and 300. When the driving environment information includes information on the road environment, this information on the road environment is analyzed for each of the categories "road width," "sight," "speed," "risk," "decision," and "operation" on the basis of driving difficulty. Therefore, the driving environment can be evaluated based on factors such as the road width, change in the road width within a predetermined zone, factors that affect sight, factors that affect speed, factors that affect risk, factors that affect a driver's decision, and factors that affect operation. The road environment is thus evaluated from several points of view, since the road environment is evaluated based on several categories. Therefore, the road environment that is constituted by various factors is precisely evaluated.

(5) When the driving environment information includes information on the traffic condition, this information on the traffic condition is analyzed for each of the categories "movable body," "sight," "speed," "risk," "decision," and "operation" on the basis of driving difficulty. Therefore, the driving environment can be evaluated based on factors such as the presence or character of a "movable body" around the road, factors that affect sight, factors that affect the speed of the host vehicle, factors that affect risk, factors that affect a driver's decision, and factors that affect operation. The traffic condition is thus evaluated from several points of view, since the traffic condition is evaluated based on several categories. Therefore, the traffic condition that is constituted by various factors is precisely evaluated.

(6) When the driving environment information includes information on the weather condition, this information on the weather condition is analyzed for each of the categories "sight," "risk," "decision," and "operation" on the basis of driving difficulty. Therefore, the driving environment can be evaluated based on factors that affect sight, factors that affect risk, factors that affect a driver's decision, and factors that affect operation. The weather condition is evaluated based on several categories. Therefore, the weather condition is evaluated from several points of view. Therefore, the weather condition that is constituted by various factors is precisely evaluated.

(7) Symbols defined correspondingly to influential factors, which are factors that affect the evaluation of the driving environment, are selected in accordance with the influential factors that are identified in evaluation of the driving environment. The selected symbols are displayed in the display section 132. Thus, not only the evaluation results of the driving environment but also the symbols indicating the influential factors affecting the evaluation results are shown as guidance.

(8) The image data that forms the driving environment information is acquired by the image acquisition section 111 mounted on the vehicle 100. The evaluation is made through the analysis of the image data acquired by the image acquisition section 111. Therefore, images are taken that show the conditions of more factors including static and dynamic factors of the driving environment of the vehicle 100. Moreover, driving environment information is acquired that represents a driving environment very close to the one viewed by the driver of the vehicle 100. Thus, the evaluation of the driving environment is made highly accurately with the use of image data.

(9) Traffic information and weather information distributed by the road traffic center, detection results of the millimeter-wave radar 112 of the vehicle 100, and information on the operation status of the wiper of the vehicle 100 are acquired as driving environment information. Therefore, a driving environment of a wider area can be evaluated from the viewpoints of a traffic condition and a weather condition. Moreover, the positional relationship between an object and the movable body in a driving environment can be taken into consideration in the evaluation based on the detection results of the millimeter-wave radar 112. Moreover, the intensity of rainfall can be determined from the amount of change in the wiper of the vehicle 100. Moreover, with the use of the traffic information, the weather information, the detection results of the millimeter-wave radar 112, and the information indicating the amount of change in the wiper of the vehicle 100 as the driving environment information, the driving environment can be identified from multiple points of view. Accordingly, the factors that affect the ease of traveling are identified precisely, and these identified factors are reflected in the evaluation results. Thus, highly precise evaluation adapted to the actual driving environment is realized.

(10) The driving environment evaluation section 230 is provided in the center 200, which collects driving environment information. The center 200 delivers the information regarding the evaluation results by the driving environment evaluation section 230 to an information terminal such as the navigation system 130 of the vehicle 100. Therefore, the driving environment evaluation section 230 can evaluate the driving environment of each traveling route based on the driving environment information collected in a wider area and from various traveling routes. The evaluation results thus achieved are delivered to the information terminal such as the navigation system 130. Thus, evaluation results of a wider area and various traveling routes can be provided via the information terminal such as the navigation system 130.

(11) The driving environment evaluation section 230 identifies a route found by the navigation system 130 and evaluates the driving environment of this identified route. Therefore, the evaluation results of the driving environment of the route to the destination can be shown as guidance. If several routes are found as the route to one destination, the driving environment is evaluated for each route. Thus, the user of the navigation system 130 can also select one route to the destination based on the evaluation of the driving environment of each route. Accordingly, a route that is easier to travel along can be suggested as guidance.

(12) In evaluation of the driving environment, the driving environment evaluation section 230 calculates basic scores by a quantitative evaluation of structural factors of the road being evaluated based on the road map data. Minus factors that reduce the ease of traveling are quantified based on identification of the driving environment indicated by the driving environment information, as shown in the example of FIGS. 2 to 6 and 10. In other words, points to be deducted from the driving ease index are calculated. These deduction points are subtracted from the basic score to calculate the driving ease index, which quantitatively evaluates the ease of traveling. Thus, an index showing the ease of traveling of a driving environment that takes static and dynamic factors into consideration is computed as an evaluation result. Thus, the actual driving environment can be precisely and quantitatively evaluated.

(13) The navigation system 130 includes the route search section 135 that searches for a route to a set destination. The navigation system 130 also includes the presentation processing section 131, which carries out a process for presenting the ease of traveling of a route to the destination that has been evaluated based on the evaluation results of the driving environment evaluation section 230 in the center 200. Thus, when a route to a destination set in the navigation system 130 is suggested as guidance, the ease of traveling of this route can be presented. The driver of the vehicle 100 can therefore know the ease of traveling to the destination in advance. When there are several routes to a destination set in the navigation system 130, the ease of traveling of each route is presented. The driver can therefore select a route based on the presented ease of traveling of each route.

(14) The display device formed by the presentation processing section 131 and the display section 132 is provided on the vehicle 100. The display section 132 displays the symbols defined correspondingly to the evaluation results of the driving environment. Therefore, the user can understand the ease of traveling of the driving environment that is the evaluation target only by viewing the symbols.

(15) When the road environment, the traffic condition, and the weather condition are represented by the first symbols Sr, St, and Sw, the display section 132 further displays the second symbols Sr1 to Sr4, St1 to St5, and Sw1 to Sw3 defined correspondingly to the influential factors, which are the factors that may affect the evaluation of the driving environment. Thus, not only the evaluation results of the driving environment, but also the influential factors affecting the evaluation results are shown as guidance, by presenting selected ones of the second symbols Sr1 to Sr4, St1 to St5, and Sw1 to Sw3.

Second Embodiment

Next, a driving environment evaluation system, a driving environment evaluation method, a driver assistance system, and a driving environment display device according to a second embodiment of the present invention will be described with reference to FIG. 20, mainly with respect to the differences from the first embodiment. The basic configurations of the driving environment evaluation system, the driving environment evaluation method, the driver assistance system, and the driving environment display device of the present embodiment are the same as those of the first embodiment. In FIG. 20, the elements that are substantially the same as those of the first embodiment are given the same reference numerals, and repeated description thereof will be omitted.

As shown in section (a) of FIG. 20, in the present embodiment, when position information is acquired in the vehicle 100 where the driving ease index is to be displayed, and a destination is set through the navigation system 130, a route from the current location indicated by the position information to the destination is searched for (steps S300, S301, and S302A). The expected arrival time at the destination is calculated, too.

The information indicating the calculated expected arrival time and the search results are sent from the vehicle 100 to the center 200 (step S303A). In response to the search results thus sent, the center 200 delivers information indicating evaluation results of the found route.

Next, when the communication I/F 102 of the vehicle 100 receives the information delivered from the center 200, it is determined whether or not this information contains information related to the driving ease index (steps S304 and S305). If the delivered information contains information related to the driving ease index (YES at step S305), the presentation process is carried out for presenting this driving ease index (step S306). Through this presentation process, the driving ease index is converted to a driving ease level, which is defined as one of several ranks, for example. Next, the driving ease level converted from the driving ease index is visually displayed in the display section 132 (step S307). The driving ease level converted from the driving ease index is also played in a voice as guidance by the sound output section 133. In the present embodiment, when a driving ease level is presented, or an image showing the driving environment in the route is displayed, the date and time when the driving environment information is acquired, based on which the driving ease level is calculated, or the date and time when the image showing the driving environment of the route is taken, are shown, too.

On the other hand, if the information delivered from the center 200 does not contain information related to the driving ease index (NO at step S305), the user is notified of an absence of the driving ease index of the found route at the center 200 (step S308).

As shown at step S410 in section (b) of FIG. 20, the center 200 receives the route search results and the information indicating the expected arrival time sent from the vehicle 100. It is then determined whether or not there is a driving ease index in the index database 242, which was acquired in the past during a time period from 15 minutes before the expected arrival time until 15 minutes after the expected arrival time, for example, and which indicates the driving ease of the route indicated in the search results (step S411).

If there is an applicable driving ease index in the index database 242 (YES at step S411), information indicating this driving ease index is extracted from the index database 242 (step S412). Next, the extracted information indicating the driving ease index is sent to the vehicle 100 that has sent the search results (step S413).

If there is a driving ease index that was not acquired in the past during a time period from 15 minutes before the expected arrival time until 15 minutes after the expected arrival time, but that is of the same route in the index database 242 (NO at step S411, YES at step S414), information indicating this driving ease index is extracted from the index database 242. Next, the extracted information indicating the driving ease index is sent to the vehicle 100 that has sent the search results (step S415).

If there is no driving ease index of the same route in the index database 242 (NO at step S414), information indicating the "absence" of an applicable driving ease index is sent to the vehicle 100 that has sent the search results (step S416).

As described above, the driving environment evaluation system, the driving environment evaluation method, the driver assistance system, and the driving environment display device according to the present embodiment provide the following advantages, in addition to the advantages (1) to (15) described in the foregoing.

(16) When the navigation system 130 of the vehicle 100 requests a driving ease index to the center 200, information indicating the route search results and the expected arrival time is sent from the navigation system 130 of the vehicle 100 to the center 200. The found route is then evaluated based on the driving environment information acquired in the same time period of the expected arrival time. Therefore, even when the driving environment changes depending on the time of day, evaluation results of the driving environment in accordance with the time of day can be presented.

Third Embodiment

Figure 21:
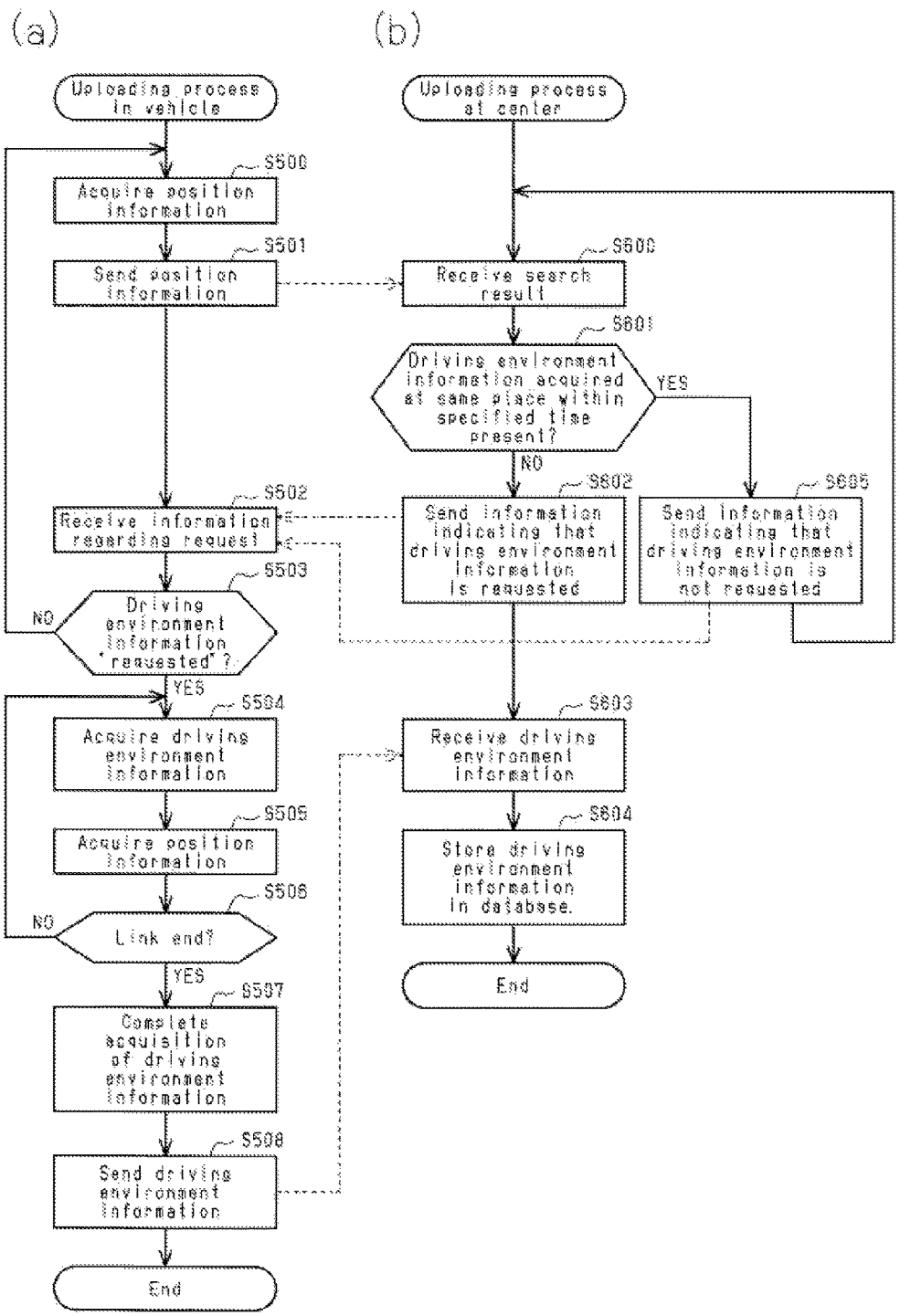
FIG. 21 is a diagram showing an example of process steps of uploading driving environment information using a driving environment evaluation system, a driving environment evaluation method, a driver assistance system, and a driving environment display device according to a third embodiment of the present invention, section (a) being a flowchart of the process steps carried out in the vehicle, and section (b) being a flowchart of an example of process steps carried out in the center.

Next, a driving environment evaluation system, a driving environment evaluation method, a driver assistance system, and a driving environment display device according to a third embodiment of the present invention will be described with reference to FIG. 21, mainly with respect to the differences from the first embodiment. The basic configurations of the driving environment evaluation system, the driving environment evaluation method, the driver assistance system, and the driving environment display device of the present embodiment are the same as those of the first embodiment. In FIG. 21, the elements that are substantially the same as those of the first embodiment are given the same reference numerals, and repeated description thereof will be omitted.

As shown in section (a) of FIG. 21, in the process steps of uploading on the vehicle side in the present embodiment, when the vehicles 100 and 300 that are to actively acquire driving environment information acquire position information, this position information is sent from the vehicles to the center 200 (steps S500 and S501).

Next, when the center 200 sends request information in response to the sent position information, it is determined whether this request information indicates that driving environment information is "requested" or "not requested" (step S502). If the request information indicates that driving environment information is "requested" (YES at step S502), the vehicles 100 and 300 acquire driving environment information (step S504). Next, position information is acquired to indicate the location where the driving environment information has been acquired (step S505). Thus, in the present embodiment, when the center 200 replies with request information that indicates that information is "requested," the vehicle 100 acquires driving environment information.

When position information is acquired, for example, it is determined whether or not driving environment information and position information of one link have been acquired (step S506). When the driving environment information of one link and its position information have been acquired (YES at step S506), the acquisition of driving environment information and position information of this link is completed (step S507). Next, the thus acquired driving environment information and position information of one link are uploaded from the vehicle 100 to the center 200 (step S508). Thus, in the present embodiment, the driving environment information acquired by the vehicle 100 is sent to the center 200 on condition that the center 200 has replied with request information indicating that information is requested.

The driving environment information and position information of each link are uploaded from the vehicle 100 to the center 200 in this manner.

On the other hand, if the request information indicates that driving environment information is "not requested" (NO at step S503), this process is ended, without any driving environment information being uploaded.

As shown in section (b) of FIG. 21, in the uploading process at the center 200, when position information sent from the vehicle 100 is received, it is determined at step S600 whether or not driving environment information that has been acquired at the same place as the one indicated by this position information within a specified time period exists in the driving environment database 240 (step S601). The specified time period is, for example, about 10 minutes in the past.

When no driving environment information that has been acquired within the specified time period exists in the driving environment database 240 (NO at step S601), it is determined that most recent driving environment information needs to be acquired and that driving environment information that has to be requested exists in the vehicle 100, and thus the center 200 sends information indicating that driving environment information is "requested" to the vehicle 100 (step S602).

When driving environment information is sent from the vehicle 100 in response to the "request" for driving environment information, this driving environment information is stored in the driving environment database 240 (steps S603 and S604). Thus, the driving environment information stored in the driving environment database 240 is updated.

On the other hand, when it is determined at step S601 that there exists driving environment information that has been acquired within the specified time period in the driving environment database 240 (YES at step S601), the center 200 sends information indicating that driving environment information is not requested to the vehicle 100 (step S605), since there is no need to acquire driving environment information from the vehicle 100.

As described above, the driving environment evaluation system, the driving environment evaluation method, the driver assistance system, and the driving environment display device according to the present embodiment provide the following advantages, in addition to the advantages (1) to (15) described in the foregoing.

(17) The vehicle 100 that is to actively acquire driving environment information acquires the driving environment information on condition that the center 200 has replied with request information indicating that information is requested. The driving environment information thus acquired is then sent. Therefore, the driving environment information is acquired and uploaded on the basis of whether or not there exists driving environment information that has been acquired within a specified time period at the same place in the driving environment database 240 of the center 200. Therefore, when the center 200 possesses driving environment information that has been acquired within the specified time period, there is no need to acquire and upload driving environment information on the vehicle 100 side. Accordingly, loads of acquiring driving environment information and communications are reduced, while the driving environment information in the driving environment database 240 is maintained up to date.

Fourth Embodiment

Next, a driving environment evaluation system, a driving environment evaluation method, a driver assistance system, and a driving environment display device according to a fourth embodiment of the present invention will be described with reference to FIGS. 22 to 25, mainly with respect to the differences from the first embodiment. The basic configurations of the driving environment evaluation system, the driving environment evaluation method, the driver assistance system, and the driving environment display device of the present embodiment are the same as those of the first embodiment. In FIGS. 22 to 25, the elements that are substantially the same as those of the first embodiment are given the same reference numerals, and repeated description thereof will be omitted.

Figure 22:
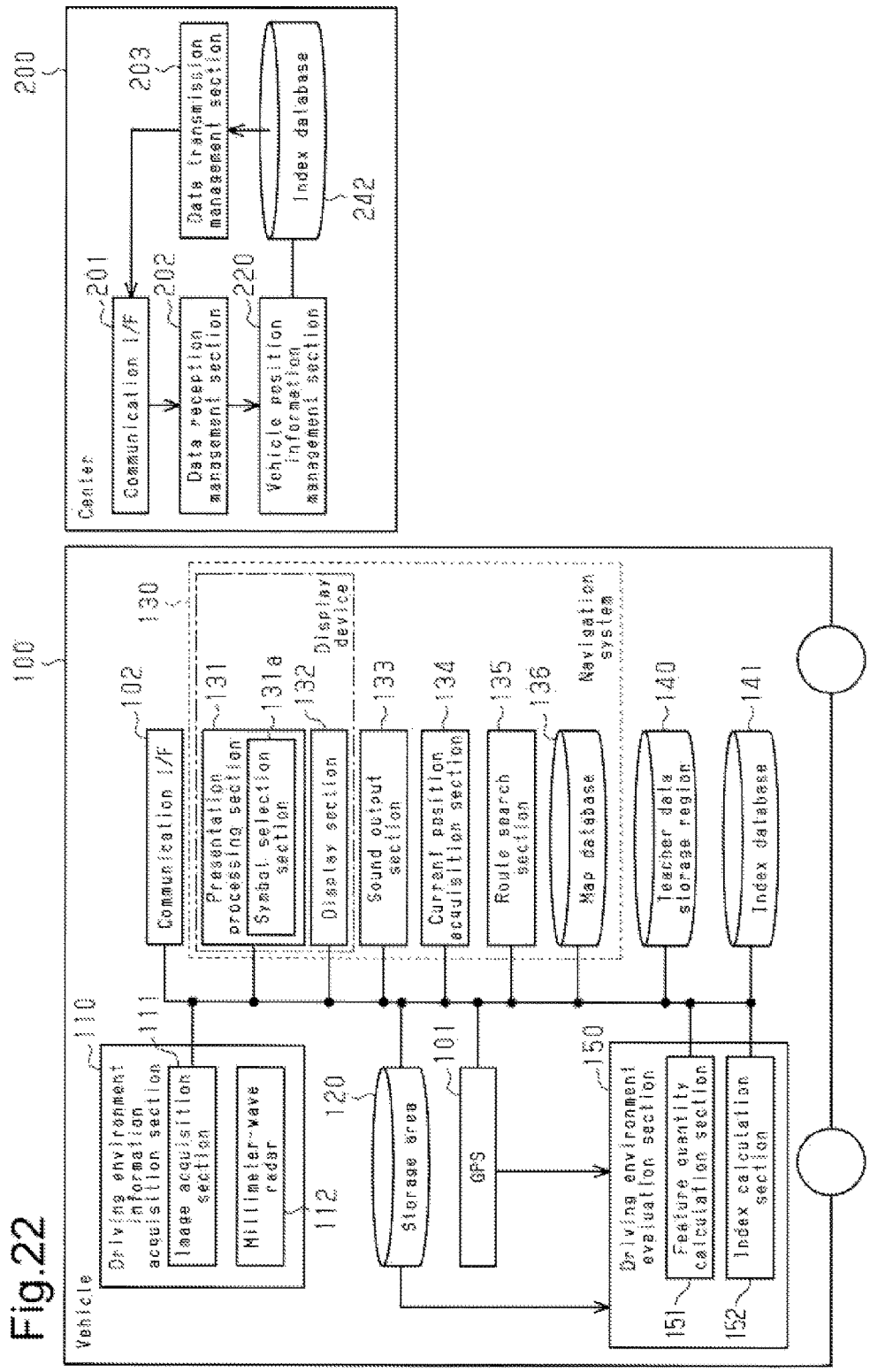
FIG. 22 is a block diagram of the general structure of a vehicle and a center, to which a driving environment evaluation system, a driving environment evaluation method, a driver assistance system, and a driving environment display device according to a fourth embodiment of the present invention are applied.

As shown in FIG. 22, the vehicle 100 of the present embodiment further includes a teacher data storage region 140 for storing multiple teacher data sets to be used for the evaluation of the driving environment information. The vehicle 100 further includes an index database 141, which stores driving ease indices, and a driving environment evaluation section 150, which evaluates driving environments.

The teacher data stored in the teacher data storage region 140 includes, for example, teacher images, which are the images that are taken when road structural factors, road environments, traffic conditions, and weather conditions are in a specific state, and teacher signals, which are the signals detected by a millimeter-wave radar or a wiper sensor. A driving ease index of the driving environment that the teacher data shows is associated with each set of teacher data.

The driving environment evaluation section 150 includes a feature quantity extraction section 151, which extracts an amount of characteristic that shows the characteristics of a driving environment from the driving environment information, and an index calculation section 152, which calculates a driving ease index based on the extracted amount of characteristic.

The feature quantity extraction section 151 acquires driving environment information stored in the storage area 120 for each link of a road as a unit, for example. When the driving environment information thus acquired contains image data, for example, the feature quantity extraction section 151 extracts, from this image data, image data showing a road environment such as utility poles, road shoulders, and road surface, as an amount of characteristic. The feature quantity extraction section 151 also extracts image data showing an object near the road such as a person, and vehicles or the like ahead, as an amount of characteristic. Further, the feature quantity extraction section 151 extracts image data showing a weather condition such as rain, snow, and fog, as an amount of characteristic. The feature quantity extraction section 151 outputs the image data extracted as an amount of characteristic to the index calculation section 152.

When the driving environment information contains detection signals of a millimeter-wave radar or wiper sensor, for example, the feature quantity extraction section 151 extracts a signal indicative of the millimeter-wave radar having detected an object, or a signal indicative of an operation of the wiper, from the driving environment information. The feature quantity extraction section 151 then outputs the thus extracted signals to the index calculation section 152.

In calculating the driving ease index, the index calculation section 152 identifies road structural factors for each link where the vehicle 100 is based on the position information stored in the storage area 120 and the map data registered in the map database 136. The index calculation section 152 then calculates the basic score based on the identified road structural factors.

When image data extracted by the feature quantity extraction section 151 is input, the index calculation section 152 compares this image data with multiple teaching data sets for an image stored in the teacher data storage region 140. The index calculation section 152 identifies one of the compared teaching data sets that has a similar amount of characteristic as that of the compared image data. That is, the index calculation section 152 matches the obtained image with the teaching data. The index calculation section 152 identifies such a teaching data set for each of a road environment, a traffic condition, and a weather condition.

When signals extracted by the feature quantity extraction section 151 are input, the index calculation section 152 compares the signals with multiple teaching data sets for signals stored in the teacher data storage region 140. The index calculation section 152 identifies one of the compared teaching data sets that has a similar amount of characteristic as that of the compared signals. The index calculation section 152 identifies such a teaching data set for each of a road environment, a traffic condition, and a weather condition.

Once a teaching data set is identified, the index calculation section 152 recognizes the points to be deducted from the driving ease index of one link associated with this teaching data set. When there is one value of the recognized points to be deducted from the driving ease index of one link, the index calculation section 152 subtracts this driving ease index from the basic score. This result of subtraction is to be the evaluation results (driving ease index) of the driving environment that was used for the calculation of the points to be deducted from the driving ease index. When there are several values of the recognized points to be deducted from the driving ease index of one link, the index calculation section 152 subtracts a total of the deduction points of the driving ease index, for example, from the basic score. This result of subtraction is to be the evaluation results (driving ease index) of the driving environment that has been used for the calculation of the points to be deducted from the driving ease index.

Once the evaluation results are achieved, the index calculation section 152 acquires position information that has been acquired on the same date and at the same time as the driving environment information used for the calculation of the driving ease index from the storage area 120. The index calculation section 152 then associates the position information with the same date and time with the information indicating the driving ease index that is the evaluation result. The index calculation section 152 outputs the information indicating the driving ease index associated with the position information to the index database 141.

The communication I/F 102 uploads the driving ease index and the information indicating the position stored in the index database 141 to the center 200 when a specified uploading condition is met.

After the uploading, the driving environment evaluation section 150 keeps on or stops calculation of the driving ease index according to the request information sent from the center 200.

Next, one example of teacher data for images stored in the teacher data storage region 140 will be described with reference to FIG. 23.

As shown in FIG. 23, the teacher data for images is configured with a plurality of image vectors (x1, y1, z1) to (xn, yn, zn) classified into categories of, for example, a road environment, a traffic condition, and a weather condition. There are image vectors for each of the driving environments corresponding to the classes of factors shown in previously-described FIGS. 2 to 6, for example, with corresponding points to be deducted from the driving ease index.

For example, if image vectors (x1, y1, z1) and (x10, y10, z10) are close to those of the image data contained in the driving environment information, their respective points 10 and 15 are deducted from the basic score. Thus, an index of driving ease is calculated based on the teacher data.

Next, one example of the process steps of uploading driving ease indices with the driving environment evaluation system, the driving environment evaluation method, the driver assistance system, and the driving environment display device according to the present embodiment will be described with reference to FIG. 24.

Figure 24:
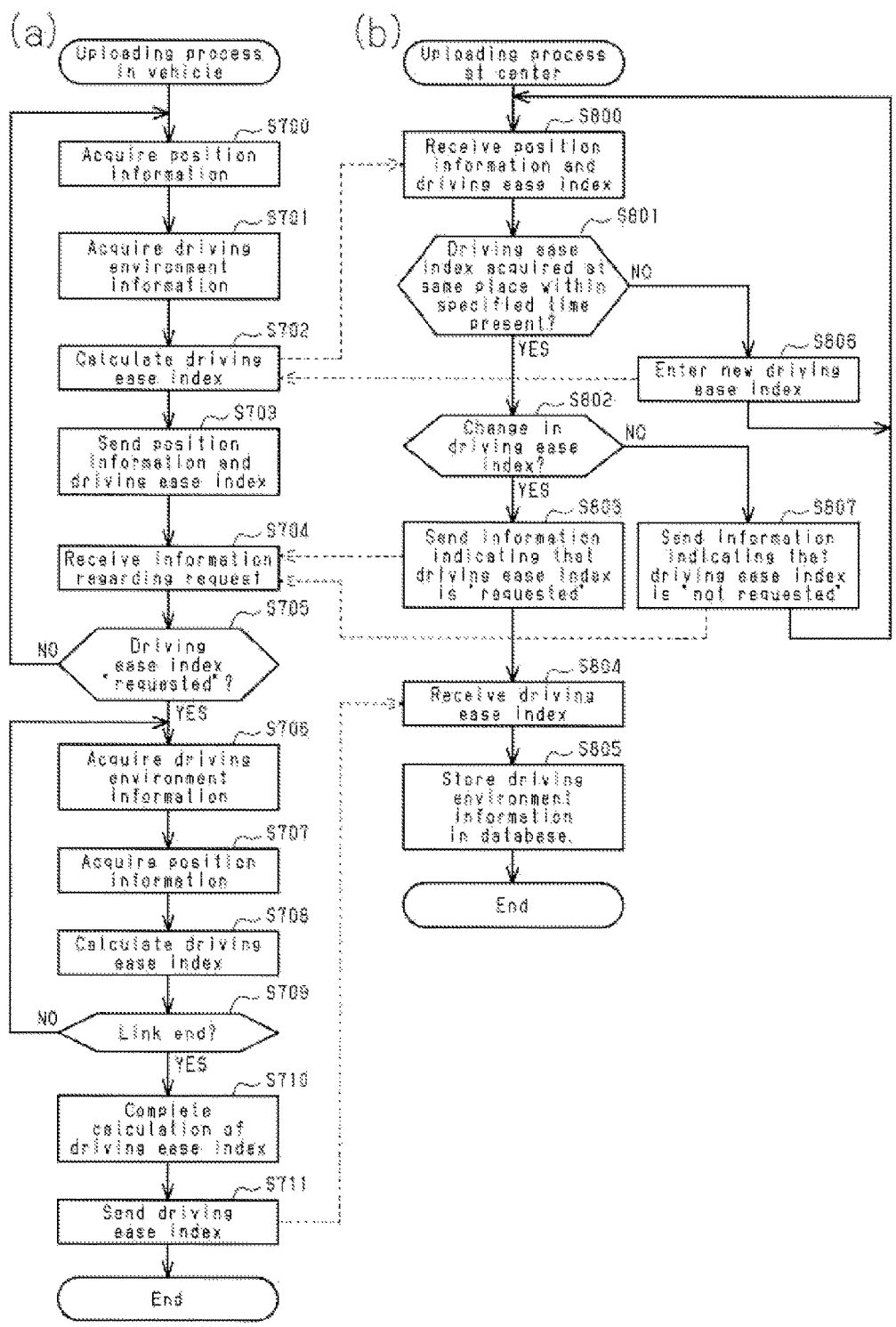
FIG. 24 is a diagram showing an example of process steps of uploading driving environment information, section (a) being a flowchart of the process steps carried out in the vehicle, and section (b) being a flowchart of an example of process steps carried out in the center.

As shown in section (a) of FIG. 24, in the process steps of uploading on the vehicle side in the present embodiment, when the vehicle 100 that is to actively acquire driving environment information acquires position information and driving environment information, the driving ease index is calculated based on the driving environment information and the teacher data (steps S700 and S702). The calculated driving ease index and corresponding position information are sent from the vehicle 100 to the center 200 (step S703).

Next, when the center 200 sends request information in response to the sent driving ease index and corresponding position information, it is determined whether this request information is "requesting" or "not requesting" driving ease index (steps S704 and S705). If the request information indicates that a driving ease index is "requested" (YES at step S705), position information and driving environment information are further acquired, and driving ease indices are further calculated (steps S706 to S708).

Next, it is determined whether or not driving ease indices for one link have been calculated (step S709). When it is determined that the driving ease indices for one link have been calculated (YES at step S709), the calculation of driving ease indices of this link is completed (step S710). Next, the information indicating the calculated driving ease indices for one link is uploaded from the vehicle 100 to the center 200 (step S711).

The driving environment information and position information of each link are uploaded from the vehicle 100 to the center 200 in this manner.

On the other hand, if the request information indicates that a driving ease index is "not requested" (NO at step S705), this process is ended, without any information on driving ease index being uploaded.

As shown in section (b) of FIG. 24, in the uploading process at the center 200, when position information and information on the driving ease index sent from the vehicle 100 are received, it is determined at step S800 whether or not there is information on the driving ease index that has been acquired at the same place as the one indicated by this position information within a specified time period in the index database 242 (step S801). The specified time period is, for example, about 10 minutes in the past.

If there is no information on the driving ease index acquired within the specified time period in the index database 242 (NO at step S801), the position information and the information on the driving ease index sent from the vehicle 100 are entered in the index database 242 (step S806).

If there is information on the driving ease index acquired within the specified time period in the index database 242 (YES at step S801), this already existing driving ease index in the index database 242 is compared with the driving ease index sent from the vehicle 100 (step S802).

Next, if, as a result of the comparison, it is determined that the driving ease index has changed (YES at S802), information indicating that the driving ease index is "requested" is sent from the center 200 to the vehicle 100 (step S803).

When information on the driving ease index is sent from the vehicle 100 in response to the "request" for the driving ease index, this information on the driving ease index is stored in the index database 242 (steps S804 and S805). Thus, the information on the driving ease index stored in the index database 242 is updated.

On the other hand, if, as a result of the comparison, it is determined that the driving ease index has not changed at step S802 (NO at S802), information indicating that the driving ease index is "not requested" is sent from the center 200 to the vehicle 100 (step S807).

Hereinafter, the process steps of calculating driving ease indices with the driving environment evaluation system, the driving environment evaluation method, the driver assistance system, and the driving environment display device according to the present embodiment will be described with reference to FIG. 25.

Figures 25, 26:
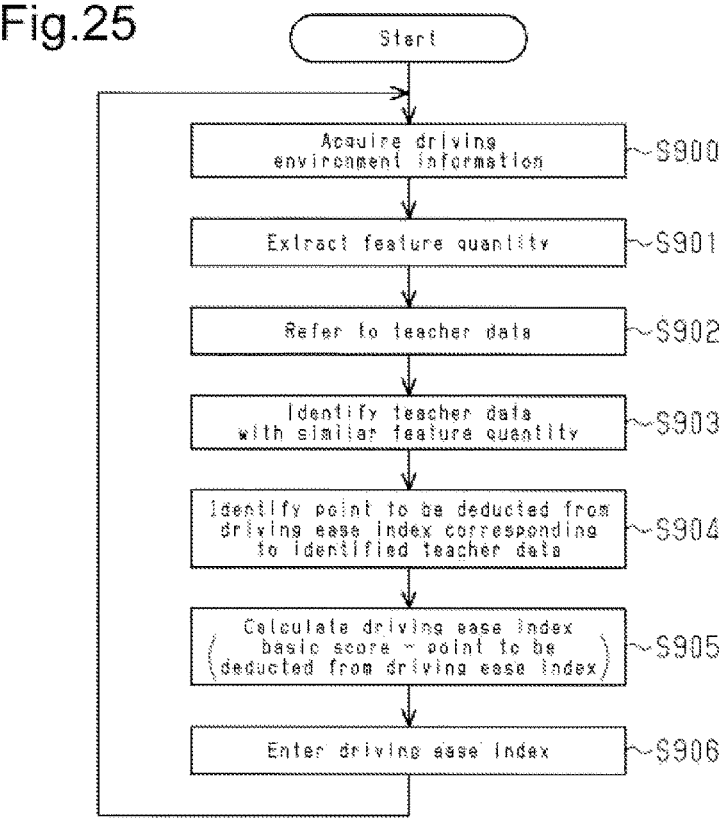
FIG. 25 is a flowchart showing an example of process steps of calculating driving ease indices with the use of the teacher data.
FIG. 26 is a diagram showing an example of teacher data used for the analysis and evaluation of a driving environment in another embodiment of a driving environment evaluation system, a driving environment evaluation method, a driver assistance system, and a driving environment display device according to the present invention.

As shown in FIG. 25, when driving environment information is acquired at step S900, an amount of characteristic is extracted from this driving environment information (step S901). Next, the extracted amount of characteristic of the driving environment information is compared with the teacher data stored in the teacher data storage region 140 (step S902). As a result of the comparison, one or a plurality of teacher data sets with a similar amount of characteristic are identified, which in turn identifies points to be deducted from the driving ease index or indices associated with the teacher data set(s) (steps S903 and S904).

Once the points to be deducted from the driving ease indices are identified, the driving ease indices are calculated by subtracting the deduction points from the basic scores that are calculated based on, for example, the map data registered in the map database 136 (step S905). The calculated driving ease indices are then stored in the index database 141, and uploaded from the vehicle 100 to the center 200 (step S906).

As described above, the driving environment evaluation system, the driving environment evaluation method, the driver assistance system, and the driving environment display device according to the present embodiment provide the following advantages, in addition to the advantages (1) to (15) described in the foregoing.

(18) Driving ease indices are calculated in the vehicle 100. Therefore, driving environment information such as image data that will be used as the basis for calculating driving ease indices need not be sent from the vehicle 100 to the center 200. Thus, the amount of communications between the vehicle 100 and the center 200 is significantly reduced.

(19) The teacher data stored in the teacher data storage region 140 is used for the calculation of the driving ease indices in the vehicle 100. The driving ease indices are calculated through comparison with the teacher data. Therefore, there is no need to analyze driving environment information such as image data in the vehicle 100, and the driving ease indices are calculated by simpler processing. Thus, while the calculation of driving ease indices is carried out in the vehicle 100, the processing for this calculation is done smoothly.

Other Embodiments

The above illustrated embodiments may be modified as follows.

Figure 27:
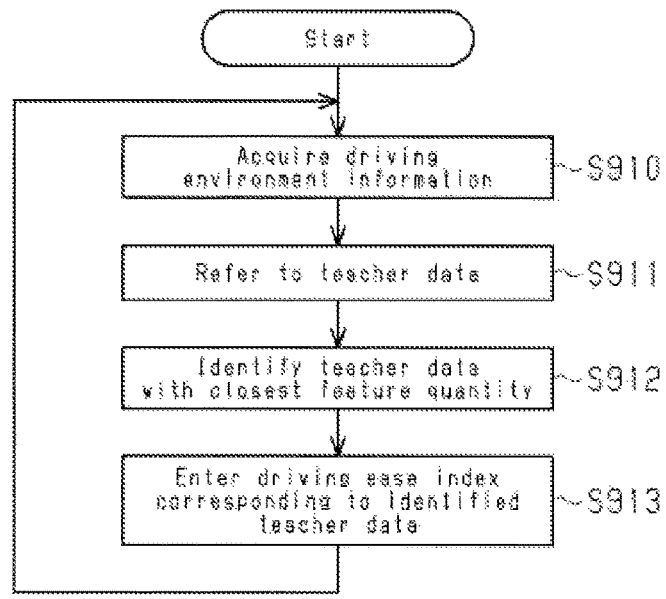
FIG. 27 is a flowchart showing an example of process steps of calculating driving ease indices with the use of the teacher data in another embodiment of a driving environment evaluation system, a driving environment evaluation method, a driver assistance system, and a driving environment display device according to the present invention.
Figure 28:
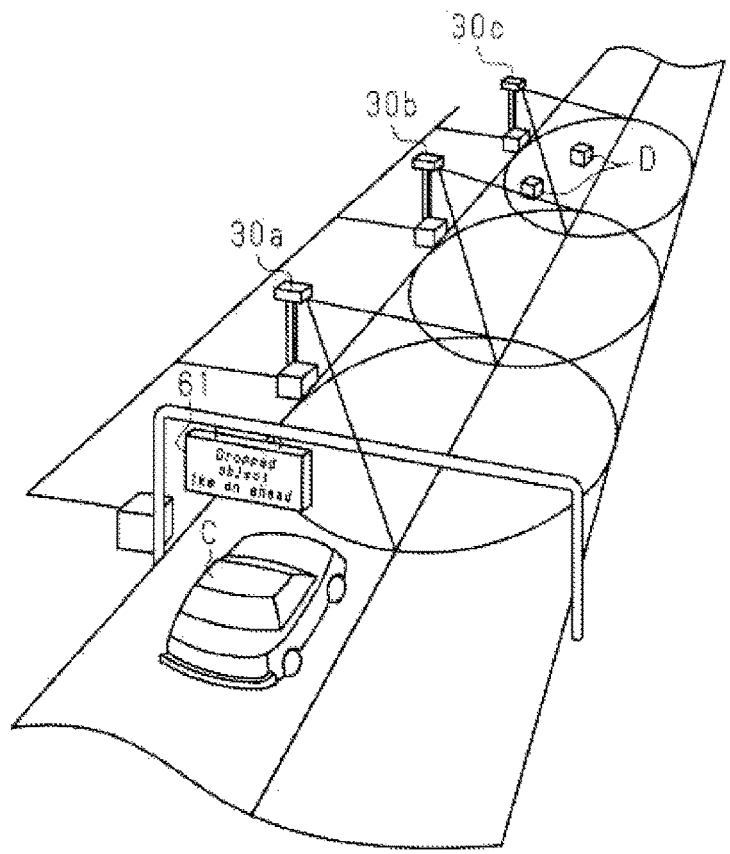
FIG. 28 is a diagram showing a conventional road monitoring system in one driving environment.

In the fourth embodiment described above, the driving environment evaluation section 150 of the vehicle 100 includes the feature quantity extraction section 151 and the index calculation section 152. This need not necessarily be so and the driving environment evaluation section 150 may include the index calculation section 152. In this case, a feature quantity is not extracted from the image data acquired by the image acquisition section 111, and the index calculation section 152 compares data of a captured image with the teacher image data stored in the teacher data storage region 140. In this configuration, as shown in FIG. 26, image vectors (x1, y1, z1) to (xn, yn, zn) that generally reflect respective factors of, for example, a road environment, a traffic condition, and a weather condition are stored in the teacher data storage region 140. The vectors (x1, y1, z1) to (xn, yn, zn) are each corresponded to driving ease indices calculated based on the respective factors of the road environment, the traffic condition, and the weather condition, indicated by these vectors. To calculate driving ease indices, as shown in FIG. 27, when image data is acquired as driving environment information at step S910, this driving environment information is compared with the teacher data stored in the teacher data storage region 140 (step S911). Next, the teacher data that is closest to the data of the captured image is identified (step S912). Once the teacher data is identified, the driving ease index associated with this teacher data is stored in the index database 141 as the driving ease index of the driving environment indicated by the image data (step S913). The information on the driving ease index stored in the index database 141 is sent from the vehicle 100 to the center 200 when a specified uploading condition is met. Thus, there is no need for the driving environment evaluation section 150 to perform the process of extracting a feature quantity from the driving environment information. Therefore, the processing load of the vehicle 100 when calculating the driving ease index on the vehicle 100 side is further reduced.

In the fourth embodiment described above, the vehicle 100 includes the teacher data storage region 140. This need not necessarily be so and the center 200 or an information terminal capable of acquiring the driving environment information may include the teacher data storage region 140 and the driving environment evaluation section 150. Thus, the center 200 or information terminal calculates driving ease indices through comparison between the teacher data and the driving environment information. Therefore, there is no need for the vehicle 100 to perform the process of analyzing driving environment information, so that the driving ease indices are calculated in a simpler configuration and by simpler processing.

In the embodiments described above, when one of the first symbols Sr, St, and Sw is selected, second symbols Sr1 to Sr4, St1 to ST5, and Sw1 to Sw3 are displayed in a hierarchical manner in accordance with the selection result. This need not necessarily be so, and the first symbols Sr, St, and Sw and the second symbols Sr1 to Sr4, St1 to ST5, and Sw1 to Sw3, which indicate influential factors, may be displayed at the same time.

In the embodiments described above, a route found by the navigation system 130 is identified, and the driving environment of this identified route is evaluated. This need not necessarily be so and a driving environment of a point in the vicinity of the vehicle 100 on which the navigation system 130 is mounted, for example, may be evaluated. Alternatively, a driving environment of a point selected by the user, for example, may be evaluated.

In the embodiments described above, symbol selection is done by the symbol selection section 131a provided in the presentation processing section 131 of the vehicle 100. This need not necessarily be so and the symbol selection section 131a may be provided in the center 200. In this configuration, when a driving ease index of the found route is calculated, the symbol selection section in the center 200 selects a symbol based on the information indicating the influential factor stored in the index database 242. The information indicating the selected symbol and the driving ease index is then delivered from the center 200 to the vehicle 100 or the like. In the vehicle 100 or the like, the process of presenting the delivered information indicating the symbol and the driving ease index is carried out. Thus, the vehicle 100 does not need to carry out the process of selecting a symbol. In this configuration, when a driving ease index is stored in the index database 242, information indicative of a symbol may be associated with the information indicating the driving ease index instead of the information indicating the influential factor.

In the embodiments described above, basic scores are calculated based on road structural factors. Driving ease indices are then calculated by subtracting deduction points from the basic scores. Instead of such a point deduction system, a point addition system may be adopted, for example. In this case, for example, a driving ease index is calculated for each of the classes of factors, or of the large categories such as a road structural factor, a road environment, a traffic condition, and a weather condition. A total sum or an average value, for example, of the calculated driving ease indices may be used as an overall driving ease index.

In the embodiments described above, road structural factors are identified based on map data. Basic scores calculated based on the road structural factors are then used for the calculation of the driving ease indices. This need not necessarily be so and a driving environment may be represented by at least one of the factors of the road environment, the traffic condition, and the weather condition, and the road structural factors need not necessarily be identified based on map data.

In the fourth embodiment described above, the driving ease indices calculated in the vehicle 100 are accumulated in the center 200. This need not necessarily be so and, instead of using the center 200, the driving ease indices calculated in the vehicle 100 may be accumulated only in the vehicle 100. Alternatively, the driving ease indices calculated in the vehicle 100 may be provided to other vehicles via vehicle-to-vehicle communication.

In the embodiments described above, a signal indicating the operating state of wipers is used as the amount of change in an operated element of the vehicle 100. In addition, for example, signals indicative of the amount of change of the steering wheel, the acceleration pedal, or the brake pedal, for example, may be used as the driving environment information. In this case, for example, a relatively low evaluation may be given to a driving environment with a larger amount of change per unit time of the steering wheel, the acceleration pedal, or the brake pedal, since such a driving environment is assumed to require a sudden driving operation. Alternatively, for example, a relatively low evaluation may be given to a driving environment with more frequent changes per unit time of the steering wheel, the acceleration pedal, or the brake pedal, since such a driving environment is assumed to require frequent driving operation. Furthermore, for example, a relatively lower evaluation may be given to a driving environment with frequent alternate turns to left and right of the steering wheel, since such a driving environment is assumed to require frequent driving operation along curves and the like.

In the embodiments described above, the driving environment information is acquired by the image acquisition section 111, the millimeter-wave radar 112, the wiper sensor, or from road traffic information and various pieces of weather information. This need not necessarily be so and the driving environment information may be acquired by or from at least one of the image acquisition section 111, the millimeter-wave radar 112, the wiper sensor, the road traffic information, and the various pieces of weather information. In addition, driving environment information may be acquired from a spectrum sensor, or via infrastructural communication or vehicle-to-vehicle communication. The point is that it can be anything as long as it helps to determine a driving environment of a movable body such as a vehicle.

In the embodiments described above, the driving environment information is acquired in the vehicle 100. This need not necessarily be so and the entity that actively acquires driving environment information may be, for example, an information terminal such as a multi-functional phone or the like.

In the embodiments described above, the driving ease indices are used in the navigation system 130 of the vehicle 100. This need not necessarily be so and the driving ease indices may be used in the information terminal that has a route search function or the like, for example. The driving ease indices may also be utilized in an application program or the like for displaying a map, for example.

In the embodiments described above, the driving ease index is calculated for each link of a road. This need not necessarily be so and the driving ease indices may be calculated each time a specified distance is driven, or a specified time has passed, for example.

In the third and fourth embodiments described above, the uploading process is carried out for each link. This need not necessarily be so and the uploading process may be carried out each time a specified distance is driven, or a specified time has passed, for example. Alternatively, the uploading process may be executed when the engine of the vehicle 100 is turned on, or turned off, for example.

In the first to third embodiments described above, the driving ease indices are calculated as required when driving environment information is sent to the center 200. This need not necessarily be so and a driving ease index of a found route may be calculated when the route search result is sent from the vehicle 100 and a driving ease index is requested.

In the embodiments described above, when the vehicle 100 sends a route to the center 200 and when there is a driving ease index of the same route in the center 200, this driving ease index is delivered to the vehicle 100. This need not necessarily be so and, when the vehicle 100 sends a route to the center 200 and when there is no driving ease index of the same route in the center 200, a driving ease index of another route with a similar driving environment may be delivered from the center 200 to the vehicle 100. Thus, the center 200 can provide a larger selection range of driving ease indices.

In the embodiments described above, either the vehicle 100 or the center 200 includes a symbol selection section. Symbols are displayed together with evaluation results of a driving environment. This need not necessarily be so, i.e., the symbol selection section may be omitted, and symbols need not necessarily be displayed.

In the embodiments described above, the road environment, the traffic condition, and the weather condition are classified hierarchically in two ways as shown in FIGS. 2 to 6 in which, on one hand, they are divided into "classes of factors" based on the factors of attributes of road structures or non-road structures, and on the other hand, they are divided into "small categories" for grouping factors that cause driving difficulty such as road width and speed. This need not necessarily be so and the road environment, the traffic condition, and the weather condition may be classified only into "classes of factors" or "small categories". In this case, the driving environment information is evaluated based on the driving ease indices or deduction points to be subtracted from the indices each corresponded to the "classes of factors" or "small categories".

In the embodiments described above, the driving ease indices are converted to five driving ease levels A, B, C, D, and E. This need not necessarily be so and there may be four or less driving ease levels, or six or more levels. Similarly, ranks assigned when calculating basic scores may be changed suitably.

In the embodiments described above, the driving ease indices are converted to driving ease levels by the presentation processing section 131 of the vehicle 100. This need not necessarily be so and the driving ease indices may be converted to driving ease levels in the center 200.

In the embodiments described above, the driving ease indices are converted into driving ease levels and presented as converted levels. This need not necessarily be so and the driving ease indices may be presented.

In the embodiments described above, the basic scores are calculated based on the flowchart shown in FIG. 9. This need not necessarily be so and the basis for calculating the basic scores may be changed suitably.

In the embodiments described above, the driving environment is evaluated in terms of driving ease for a vehicle 100 as a movable body. This need not necessarily be so and the movable body may be the user of an information terminal, for example. In this case, the driving environment is evaluated in terms of the ease of traveling for the user.

DESCRIPTION OF THE REFERENCE NUMERALS

100 Vehicle
101 GPS
102 Communication I/F
110 Driving environment information acquisition section
111 Image acquisition section
112 Millimeter-wave radar
120 Storage area
130 Navigation system
131 Presentation processing section
131a Symbol selection section
132 Display section
133 Sound output section
134 Current position acquisition section
135 Route search section
136 Map database
140 Teacher data storage region
141 Index database
150 Driving environment evaluation section
151 Feature quantity extraction section
152 Index calculation section
200 Center
201 Communication I/F
202 Data reception management section
203 Data transmission management section
210 Information processing section
220 Vehicle position information management section
230 Driving environment evaluation section
231 Environment recognition section
232 Index calculation section
233 Index table
240 Driving environment database
241 Map database
242 Index database
300 Vehicle
D Fallen object
Sr First symbol (road environment)
St First symbol (traffic condition)
Sw First symbol (weather condition)
Sr1 to Sr4 Second symbol (influential factor of road environment)
St1 to St5 Second symbol (influential factor of traffic condition)
Sw1 to Sw3 Second symbol (influential factor of weather condition)

The invention claimed is:

1. A driving environment evaluation system, comprising: at least one processor comprising:
    a driving environment information acquisition section, which acquires driving environment information, which is information on a driving environment of a movable body from an image taken by a camera mounted on the movable body or from an object detected by a millimeter-wave radar;
    a position acquisition section, which acquires a position where the driving environment information is acquired; and
    a driving environment evaluation section, which quantitatively evaluates ease of traveling of a driving environment of the movable body based on an analysis of driving environment information acquired by the driving environment information acquisition section,
    wherein the driving environment evaluation section is configured to evaluate the ease of traveling of the driving environment of the movable body through an analysis of an element of the acquired driving environment information, which changes dynamically at each position, wherein
    the driving environment evaluation section evaluates the driving environment through process steps of:
    a) calculating a basic score by a quantitative evaluation of structural factors of a road to be evaluated, based on road map data containing information on a road map registered therein;
    b) quantifying minus factors that reduce the ease of traveling based on an analysis of a road environment, a traffic condition and a weather condition of a driving environment indicated by the driving environment information; and
    c) calculating an index that quantitatively evaluates the ease of traveling by subtracting quantified values of the minus factors that reduce the ease of traveling from the basic score.

2. The driving environment evaluation system according to claim 1, wherein
    a symbol is defined for each of a plurality of influential factors, which are factors that affect the evaluation of the driving environment, and
    the system further includes a symbol selection section, which selects one of the symbols corresponding to an influential factor identified in the evaluation of the driving environment.

3. The driving environment evaluation system according to claim 1, wherein
    the driving environment information contains information on at least one factor of traffic information or weather information distributed by a road traffic center, detection results of a millimeter-wave radar provided to the movable body, and an amount of change in an operated element of the movable body.

4. The driving environment evaluation system according to claim 1, wherein
the driving environment evaluation section is provided to a center where the acquired driving environment information is collected, and
the center includes a distribution section, which distributes information on evaluation results produced by the driving environment evaluation section to an information terminal.

5. The driving environment evaluation system according to claim 4, wherein
the driving environment evaluation section determines at least one of a route found by a route search function of the information terminal and a position of the information terminal, and evaluates a driving environment of the determined route or position.

6. The driving environment evaluation system according to claim 1, wherein
the driving environment information acquisition section and the driving environment evaluation section are mounted on an information terminal, and
the driving environment evaluation section evaluates the driving environment through matching of the driving environment information with a plurality of identification information sets given for identification of the driving environment.

7. A driver assistance system that assists a driver in driving a movable body, comprising:
a route search section, which searches for a route to a set destination; and
a presentation processing section, which carries out a process step of presenting ease of traveling of a route to the destination evaluated based on an evaluation result produced by the driving environment evaluation system according to claim 1.

8. A driving environment evaluation system, comprising:
at least one processor comprising:
a driving environment information acquisition section, which acquires driving environment information, which is information on a driving environment of a movable body from an image taken by a camera mounted on the movable body or from an object detected by a millimeter-wave radar;
a position acquisition section, which acquires a position where the driving environment information is acquired; and
a driving environment evaluation section, which quantitatively evaluates ease of traveling of a driving environment of the movable body based on an analysis of driving environment information acquired by the driving environment information acquisition section,
wherein the driving environment evaluation section is configured to evaluate the ease of traveling of the driving environment of the movable body through an analysis of an element of the acquired driving environment information, which changes dynamically at each position, wherein the driving environment information includes information on at least one factor of a road environment, which includes at least a non-road structure, a traffic condition, which includes at least one of a nature of an object and site-related characteristics, and a weather condition, which includes at least site-related characteristics, and wherein
information on the road environment, the traffic condition, and the weather condition is classified based on categories that are specified for each of factors correlated to ease of traveling by the movable body, and
the driving environment evaluation section analyzes each of the categories as one unit and integrates analysis results given per category to make a quantitative evaluation of the ease of traveling.

9. The driving environment evaluation system according to claim 8, wherein
the movable body is a vehicle, and
when the driving environment information contains information on the road environment, the driving environment evaluation section analyzes information on the road environment in at least one of categories of "road width," which is a width of a road, "sight" of a driver of the vehicle, "speed" of the vehicle, "risk" of the road environment, "decision" made by the driver of the vehicle, and "operation" required for driving of the vehicle.

10. The driving environment evaluation system according to claim 8, wherein
the movable body is a vehicle, and
when the driving environment information contains information on the traffic condition, the driving environment evaluation section analyzes information on the traffic condition in at least one of categories of "movable body" other than a host vehicle, "sight" of a driver of the vehicle, "speed" of at least the host vehicle, "risk" around the vehicle, "decision" made by the driver of the vehicle, and "operation" required for driving of the vehicle.

11. The driving environment evaluation system according to claim 8, wherein
the movable body is a vehicle, and
when the driving environment information contains information on the weather condition, the driving environment evaluation section analyzes information on the weather condition in at least one of categories of "sight" of a driver of the vehicle, "risk" in driving the vehicle, "decision" made by the driver of the vehicle, and "operation" required for driving of the vehicle.

12. A driving environment display device, which displays evaluation results of a driving environment of a movable body, comprising a display section, which displays an evaluation of a driving environment of a movable body, wherein ease of traveling of a road is evaluated based on an analysis of the driving environment of the movable body as one of symbols defined correspondingly to the evaluation results of the driving environment, wherein ease of traveling of a road is evaluated based on an analysis of an element of the driving environment, which changes dynamically at each position of the movable body acquired from an image taken by a camera mounted on the movable body or from an object detected by a millimeter-wave radar, wherein
the ease of traveling of the road is evaluated through process steps of:
a) calculating a basic score by a quantitative evaluation of structural factors of a road to be evaluated, based on road map data containing information on a road map;
b) quantifying minus factors that reduce the ease of traveling based on an analysis of a road environment, a traffic condition and a weather condition of a driving environment indicated by the driving environment information; and
c) calculating an index that quantitatively evaluates the ease of traveling by subtracting quantified values of the minus factors that reduce the ease of traveling from the basic score.

13. The driving environment display device according to claim 12, wherein the display section displays at least one factor of a road environment, a traffic condition, and a weather condition as a first symbol, and displays a second symbol, which is defined correspondingly to an influential factor, which is a factor that affects the evaluation of the driving environment.

14. A driving environment evaluation method comprising the steps of:

acquiring driving environment information, which is information on a driving environment of a movable body from an image taken by a camera mounted on the movable body or from an object detected by a millimeter-wave radar;

acquiring a position where the driving environment information is acquired; and quantitatively evaluating ease of traveling of a driving environment of the movable body based on an analysis of the acquired driving environment information, wherein, evaluating the ease of traveling of the driving environment of the movable body is performed through an analysis of an element of the acquired driving environment information that changes dynamically at each position, including the steps of:

a) calculating a basic score by a quantitative evaluation of structural factors of a road to be evaluated, based on road map data containing information on a road map registered in the driving environment display device;

b) quantifying minus factors that reduce the ease of traveling based on an analysis of a road environment, a traffic condition and a weather condition of a driving environment indicated by the driving environment information; and c) calculating an index that quantitatively evaluates the ease of traveling by subtracting quantified values of the minus factors that reduce the ease of traveling from the basic score.

* * * * *